United States Patent
Niwa et al.

(10) Patent No.: US 10,137,772 B2
(45) Date of Patent: Nov. 27, 2018

(54) TANK LID UNIT AND FUEL SUPPLY DEVICE

(71) Applicants: DENSO CORPORATION, Kariya, Aichi-pref. (JP); DENSO KOREA AUTOMOTIVE CORPORATION, Changwon-si, Gyeongsangnam-do (KR)

(72) Inventors: Yutaka Niwa, Kariya (JP); Shingo Fukuoka, Kariya (JP); Sanghoon Lee, Changwon-si (KR); Hyoyeol Kim, Changwon-si (KR)

(73) Assignees: DENSO CORPORATION, Kariya (JP); DENSO KOREA AUTOMOTIVE CORPORATION, Changwon-si (KR)

( * ) Notice: Subject to any disclaimer, the term of this patent is extended or adjusted under 35 U.S.C. 154(b) by 40 days.

(21) Appl. No.: 15/536,899

(22) PCT Filed: Dec. 14, 2015

(86) PCT No.: PCT/JP2015/006219
§ 371 (c)(1),
(2) Date: Jun. 16, 2017

(87) PCT Pub. No.: WO2016/098339
PCT Pub. Date: Jun. 23, 2016

(65) Prior Publication Data
US 2017/0355261 A1    Dec. 14, 2017

(30) Foreign Application Priority Data
Dec. 18, 2014   (JP) ................ 2014-256562

(51) Int. Cl.
*H01R 13/52* (2006.01)
*B60K 15/04* (2006.01)
(Continued)

(52) U.S. Cl.
CPC .......... *B60K 15/0406* (2013.01); *B60K 15/03* (2013.01); *F02M 37/10* (2013.01);
(Continued)

(58) Field of Classification Search
CPC ...................................................... H01R 12/79
(Continued)

(56) References Cited

U.S. PATENT DOCUMENTS 9,327,595 B2 * 5/2016 Miyamoto ............. B60K 13/04
2011/0192381 A1   8/2011 Maruyama et al.

FOREIGN PATENT DOCUMENTS

JP         2001-99029         4/2001

OTHER PUBLICATIONS

International Search Report for PCT/JP2015/006219, dated Mar. 8, 2016, 4 pages.

* cited by examiner

*Primary Examiner* — David S Luo
(74) *Attorney, Agent, or Firm* — Nixon & Vanderhye PC

(57) ABSTRACT

A total dimension of spacing dimensions of a gap provided by a metal rod on a side opposite to a metal housing in a first assembling structure and a second assembling structure is set to be larger than a difference in a thermal expansion amount between a resin lid main body and the metal housing in a reference radial direction when a temperature exceeds a reference temperature. A total dimension of each of a spacing dimension of a gap provided by the metal rod on a side toward the metal housing and a spacing dimension between a resin protrusion and the metal housing in the first assembling structure and the second assembling structure is set to be larger than a difference in a thermal shrinkage amount between the resin lid main body and the metal
(Continued)

housing in the reference radial direction when a temperature falls below the reference temperature.

10 Claims, 16 Drawing Sheets

(51) Int. Cl.
*B60K 15/03* (2006.01)
*F02M 37/10* (2006.01)
*H01R 12/77* (2011.01)
*H01R 12/79* (2011.01)
*F02M 37/08* (2006.01)

(52) U.S. Cl.
CPC ........... *F02M 37/103* (2013.01); *H01R 12/77* (2013.01); *H01R 12/79* (2013.01); *H01R 13/521* (2013.01); *B60K 2015/03111* (2013.01); *B60K 2015/03243* (2013.01); *B60K 2015/03447* (2013.01); *F02M 2037/082* (2013.01)

(58) Field of Classification Search
USPC .................................................. 318/662, 34
See application file for complete search history.

TANK LID UNIT AND FUEL SUPPLY DEVICE

CROSS-REFERENCE TO RELATED APPLICATIONS

The present application is the U.S. national phase of International Application No. PCT/JP2015/006219 filed Dec. 14, 2015, which designated the U.S. and claims priority to Japanese patent application No. 2014-256562 filed on Dec. 18, 2014, the entire contents of each of which are incorporated herein by reference.

TECHNICAL FIELD

The present disclosure relates to a tank lid unit and a fuel supply device.

BACKGROUND ART

Up to now, in a fuel supply device which supplies a fuel from an inside of a fuel tank to an outside of the fuel tank by a fuel pump, a tank lid unit which is installed at a through hole of the fuel tank is provided. As a kind of tank lid unit, Patent Literature 1 discloses a tank lid unit in which a drive circuit for driving the fuel pump inside the fuel tank is accommodated.

More specifically, in the tank lid unit disclosed in Patent Literature 1, a metal housing that internally houses the drive circuit is assembled above a resin lid main body that closes the through hole of the fuel tank.

PRIOR ART LITERATURE

Patent Literature

Patent Literature 1: JP 2011-163212 A

SUMMARY

However, in the tank lid unit disclosed in Patent Literature 1, the metal housing is embedded in the resin lid main body by insert molding and assembled together. Therefore, when the resin lid main body and the metal housing thermally expand according to an increase in an ambient temperature, the resin lid main body and the metal housing are positionally deviated from each other according to a difference in a thermal expansion amount. As a result, there is a risk that damage such as cracks occurs in an assembling portion of the resin lid main body to which the metal housing is assembled. Likewise, when the resin lid main body and the metal housing thermally shrink according to a reduction in the ambient temperature, both of the resin lid main body and the metal housing are positionally deviated according to a difference in an thermal shrinkage amount. As a result, there is a risk that damage such as cracks occurs in an assembling portion of the resin lid main body to which the metal housing is assembled.

The present disclosure has been made in view of the problems described above, and an object of the present disclosure is to provide a tank lid unit for reducing damage in a portion of a resin lid main body to which a metal housing is assembled, and a fuel supply device disposed in the tank lid unit.

According to a tank lid unit of a first aspect for resolving the aforementioned themes, the tank lid unit is installed at a through hole of a fuel tank and houses a drive circuit for driving a fuel pump in the fuel tank, and includes a resin lid main body that is made of a resin material and closes the through hole, a metal housing that is made of a metal material and internally houses the drive circuit, and a first assembling structure and a second assembling structure which are disposed on both sides of the metal housing in a reference radial direction of the resin lid main body, and which assemble the metal housing above the resin lid main body, where each of the first assembling structure and the second assembling structure includes a metal rod that is made of a metal material, a resin protrusion that is formed integrally with the resin lid main body and protrudes upward from the resin lid main body at a place spaced away from the metal housing laterally along the reference radial direction, the resin protrusion being fixedly fitted to the metal rod due to the metal rod being inserted through the resin protrusion, and a metal protrusion that is formed integrally with the metal housing and protrudes from the metal housing laterally along the reference radial direction, the metal protrusion providing a gap in the reference radial direction between the metal protrusion and the metal rod due to the metal rod being inserted through the metal protrusion, a total dimension of a spacing dimension of the gap provided by the metal rod on a side opposite to the metal housing in the first assembling structure and a spacing dimension of the gap provided by the metal rod on a side opposite to the metal housing in the second assembling structure is set to be larger than a difference in a thermal expansion amount between the resin lid main body and the metal housing in the reference radial direction when a temperature exceeds a reference temperature, a total dimension of a spacing dimension of the gap provided by the metal rod on a side toward the metal housing in the first assembling structure and a spacing dimension of the gap provided by the metal rod on a side toward the metal housing in the second assembling structure is set to be larger than a difference in a thermal shrinkage amount between the resin lid main body and the metal housing in the reference radial direction when the temperature falls below the reference temperature, and a total dimension of a spacing dimension between the resin protrusion and the metal housing in the first assembling structure and a spacing dimension between the resin protrusion and the metal housing in the second assembling structure is set to be larger than the difference in the thermal shrinkage amount.

According to a first aspect as described above, in the first assembling structure and the second assembling structure on both sides of the metal housing in the reference radial direction of the resin lid main body, the resin protrusion integral with the resin lid main body and the metal protrusion integral with the metal housing are protruded upward and laterally along the reference radial direction, respectively. In each of the assembling structures described above, the metal rod that is inserted through the resin protrusion and is fixedly fitted to the resin protrusion is also inserted through the metal protrusion. As a result, a gap is provided in the reference radial direction between the metal rod and the metal protrusion.

For that reason, when the resin lid main body and the metal housing are thermally expanded or thermally shrunk, a positional deviation between the resin protrusion and the metal protrusion is enabled according to the gap in each of the assembling structures. Further, in each of the assembling structures, the metal rod inserted through and fixedly fitted to the resin protrusion is also inserted through the metal protrusion, to thereby space the resin protrusion apart from the metal housing. For that reason, when the resin lid main body and the metal housing thermally shrink, the positional deviation between the metal housing and the resin protrusion in each of the assembling structures is enabled according to the separation.

Therefore, the total dimension of the spacing dimensions of the gap provided by the metal rod on the side opposite to the metal housing in both of those assembling structures is set to be larger than the difference in the thermal expansion amount between the resin lid main body and the metal housing in the reference radial direction when the temperature exceeds the reference temperature. As a result, in each of the assembling structures, even if the ambient temperature increases and exceeds the reference temperature, the positional deviation of the resin protrusion from the metal protrusion together with the metal rod to the side opposite to the metal housing is acceptable in the reference radial direction due to the gap of the total dimension larger than the difference in the thermal expansion amount. Therefore, when the ambient temperature exceeds the reference temperature, the damage of a portion of the resin lid main body to which the metal housing is assembled can be reduced.

In addition, the total dimension of each of the spacing dimension of the gap provided by the metal rod on the side toward the metal housing and the spacing dimension between the resin protrusion and the metal housing in both of those assembling structures is set to be larger than the difference in the thermal shrinkage amount between the resin lid main body and the metal housing in the reference radial direction when the ambient temperature falls below the reference temperature. As a result, in each of the assembling structures, even if the ambient temperature decreases and falls below the reference temperature, the positional deviation of the resin protrusion from the metal protrusion together with the metal rod to the metal housing side is acceptable in the reference radial direction due to the gap of the total dimension larger than the difference in the thermal shrinkage amount. At the same time, in each of the assembling structures, even if the ambient temperature decreases and falls below the reference temperature, the positional deviation of the resin protrusion together with the metal rod to the metal housing side is acceptable in the reference radial direction due to the separation of the total dimension larger than the difference in the thermal shrinkage amount. As a result, even when the ambient temperature falls below the reference temperature, the damage of a portion of the resin lid main body to which the metal housing is assembled can be reduced.

According to a tank lid unit of a second aspect for resolving the aforementioned themes, a tank lid unit is installed at a through hole of a fuel tank and houses a drive circuit for driving a fuel pump in the fuel tank, and includes a resin lid main body that is made of a resin material and closes the through hole, a metal housing that is made of a metal material and internally houses the drive circuit, and a first assembling structure and a second assembling structure which are disposed on both sides of the metal housing in a reference radial direction of the resin lid main body, and which assemble the metal housing above the resin lid main body, where each of the first assembling structure and the second assembling structure includes a metal rod that is made of a metal material, a resin protrusion that is formed integrally with the resin lid main body and protrudes upward from the resin lid main body at a place spaced away from the metal housing laterally along the reference radial direction, the resin protrusion being fixedly fitted to the metal rod due to the metal rod being inserted through the resin protrusion, and a metal protrusion that is formed integrally with the metal housing and protrudes from the metal housing laterally along the reference radial direction, the metal rod being inserted through the metal protrusion, a first metal protrusion that serves as the metal protrusion of the first assembling structure provides a gap between the first metal protrusion and the inserted metal rod in the reference radial direction, a second metal protrusion that serves as the metal protrusion of the second assembling structure is fixedly fitted to the inserted metal rod, a spacing dimension of the gap provided by the metal rod on a side opposite to the metal housing in the first assembling structure is set to be larger than a difference in a thermal expansion amount between the resin lid main body and the metal housing in the reference radial direction when a temperature exceeds a reference temperature, and a spacing dimension of the gap provided by the metal rod on a side toward the metal housing in the first assembling structure and a spacing dimension between the resin protrusion and the metal housing in the first assembling structure are set to be larger than a difference in a thermal shrinkage amount between the resin lid main body and the metal housing in the reference radial direction when the temperature falls below the reference temperature.

According to a second aspect as described above, in the first assembling structure and the second assembling structure on both sides of the metal housing in the reference radial direction of the resin lid main body, the resin protrusion integral with the resin lid main body and the metal protrusion integral with the metal housing are protruded upward and laterally along the reference radial direction, respectively. In the second assembling structure of those assembling structures, the metal rod is inserted through and fixedly fitted to the resin protrusion and the second metal protrusion. On the other hand, in the first assembling structure, the metal rod that is inserted through the resin protrusion and is fixedly fitted to the resin protrusion is also inserted through the first metal protrusion. As a result, a gap is provided in the reference radial direction between the metal rod and the first metal protrusion.

For that reason, when the resin lid main body and the metal housing are thermally expanded or thermally shrunk, in the second assembling structure, the positional deviation of the resin protrusion and the second metal protrusion which are fixedly fitted to the metal rod is regulated. On the other hand, in the first assembling structure, the positional deviation of the resin protrusion and the first metal protrusion is enabled according to the gap. Further, in each of the assembling structures, the metal rod inserted through and fixedly fitted to the resin protrusion is also inserted through the first metal protrusion or the second metal protrusion, to thereby separate the resin protrusion and the metal housing from each other. For that reason, when the resin lid main body and the metal housing thermally shrink, the positional deviation between the metal housing and the resin protrusion in each of the assembling structures is enabled according to the separation.

Therefore, the spacing dimensions of the gap provided by the metal rod on the side opposite to the metal housing in the first assembling structure is set to be larger than the difference in the thermal expansion amount between the resin lid main body and the metal housing in the reference radial direction when the ambient temperature exceeds the reference temperature. As a result, in the first assembling structure, even if the ambient temperature increases and exceeds the reference temperature, the positional deviation of the resin protrusion from the first metal protrusion together with the metal rod to the side opposite to the metal housing is acceptable in the reference radial direction due to the gap of the spacing dimension larger than the difference in the thermal expansion amount. Therefore, when the ambient temperature exceeds the reference temperature, the damage of a portion of the resin lid main body to which the metal housing is assembled can be reduced.

In addition, the spacing dimension of the gap provided by the metal rod on the side toward the metal housing in the first assembling structure and the spacing dimension between the resin protrusion and the metal housing in the first assembling structure are set to be larger than the difference in the thermal shrinkage amount between the resin lid main body and the metal housing in the reference radial direction when the ambient temperature falls below the reference temperature. As a result, in the first assembling structure, even if the ambient temperature decreases and falls below the reference temperature, the positional deviation of the resin protrusion from the first metal protrusion together with the metal rod to the metal housing side is acceptable in the reference radial direction due to the gap of the spacing dimension larger than the difference in the thermal shrinkage amount. At the same time, in each of the assembling structures, even if the ambient temperature decreases and falls below the reference temperature, the positional deviation of the resin protrusion together with the metal rod to the metal housing side is acceptable in the reference radial direction due to the separation of the dimension larger than the difference in the thermal shrinkage amount. As a result, even when the ambient temperature falls below the reference temperature, the damage of a portion of the resin lid main body to which the metal housing is assembled can be reduced.

A fuel supply device according to a third aspect of the disclosure includes a tank lid unit according to the first or second aspect together with a fuel pump which supplies the fuel from the inside of a fuel tank to the outside of the fuel tank.

As described above, according to the fuel supply device of the third aspect provided with the tank lid unit of the first or second aspect employing the dimension setting as described above, the positional deviation of the resin protrusion from the metal protrusion and the metal housing is permissible in the reference radial direction and the effect of reducing the damage can be exerted.

DESCRIPTION OF EMBODIMENTS

Figure 1:
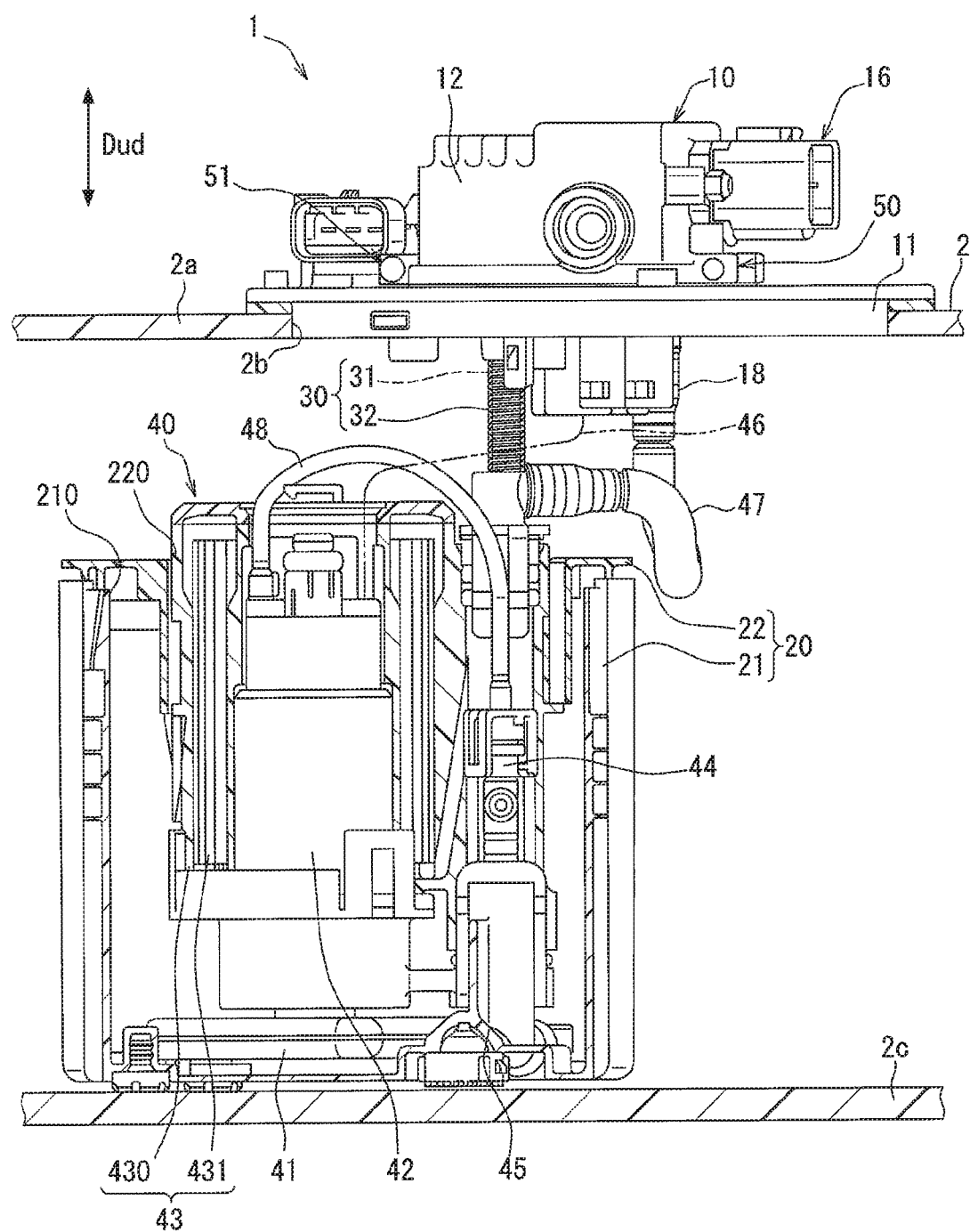
FIG. 1 is a cross-sectional view illustrating a fuel supply device according to a first embodiment.

Hereinafter, description will be given of the multiple embodiments of the present disclosure based on the drawings. The same reference numerals are assigned to the corresponding elements in the embodiments, and overlapping descriptions thereof may be omitted. When only a portion of a configuration in each embodiment is described, with respect to other portions of the configuration, configurations of other embodiments described in advance can be applied. In addition to the combinations of configurations clearly depicted in the explanation of the embodiments, as long as problems do not particularly arise in a combination, the configurations of multiple embodiments may be partially combined with each other, even when not clearly described.

First Embodiment

As illustrated in FIG. 1, a fuel supply device 1 according to a first embodiment of the present disclosure is mounted on a fuel tank 2 of a vehicle. The fuel supply device 1 supplies a fuel from an inside of the fuel tank 2 toward an internal combustion engine outside the fuel tank 2 in the vehicle. In this example, the fuel tank 2 equipped with the fuel supply device 1 is made of a resin material or a metal material, formed in a hollow shape, and stores the fuel to be supplied to the internal combustion engine. In addition, the internal combustion engine to be supplied with the fuel from the fuel supply device 1 may be a gasoline engine or a diesel engine. Incidentally, a vertical direction Dud illustrated in FIGS. 1 to 6 and 8 substantially coincides with a vertical direction of the vehicle on a horizontal plane.

(Basic Configuration)

First, a basic configuration of the fuel supply device 1 will be described. As illustrated in FIG. 1, the fuel supply device 1 includes a tank lid unit 10, a sub-tank 20, an adjustment mechanism 30, and a pump unit 40. In this example, the sub-tank 20, the adjustment mechanism 30, and the pump unit 40 other than the tank lid unit 10 of the fuel supply device 1 are accommodated in the fuel tank 2. The tank lid unit 10 is installed at a through hole 2b that penetrates a top plate portion 2a of the fuel tank 2.

As illustrated in FIGS. 1 to 8, the tank lid unit 10 includes a resin lid main body 11, a metal housing 12, a drive circuit 13, an internal connection structure 14, an external connection structure 16, a buffer member 17, and a fuel discharge pipe 18. The resin lid main body 11 is formed in a disk shape made of a resin material such as polyacetal resin (POM) excellent in fuel resistance property. As illustrated in FIG. 1, the resin lid main body 11 is fitted in the through hole 2b of the top plate portion 2a so as to close the through hole 2b above the fuel in the fuel tank 2.

Figure 3:
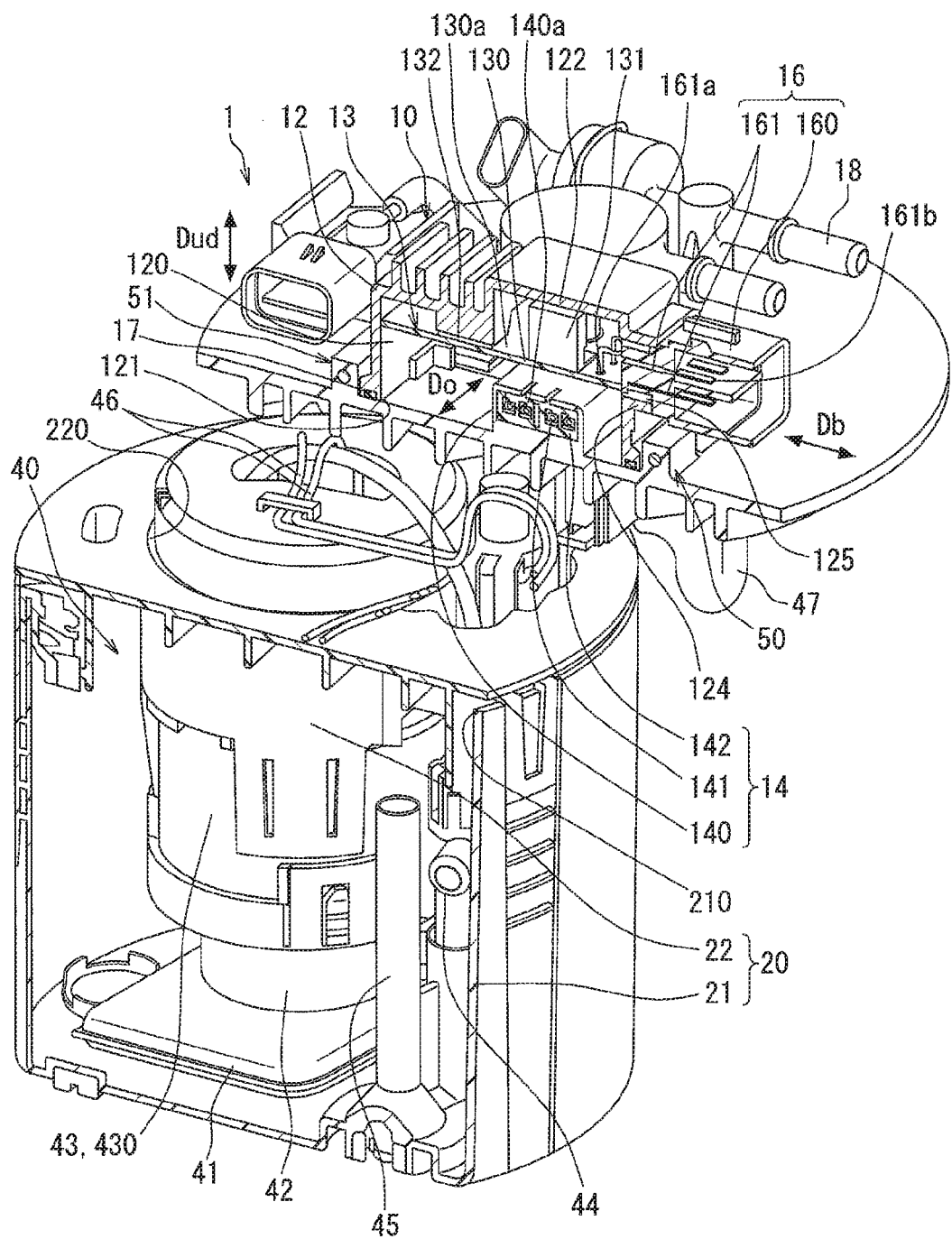
FIG. 3 is a partially sectional perspective view illustrating the fuel supply device of FIG. 1.
Figure 4:
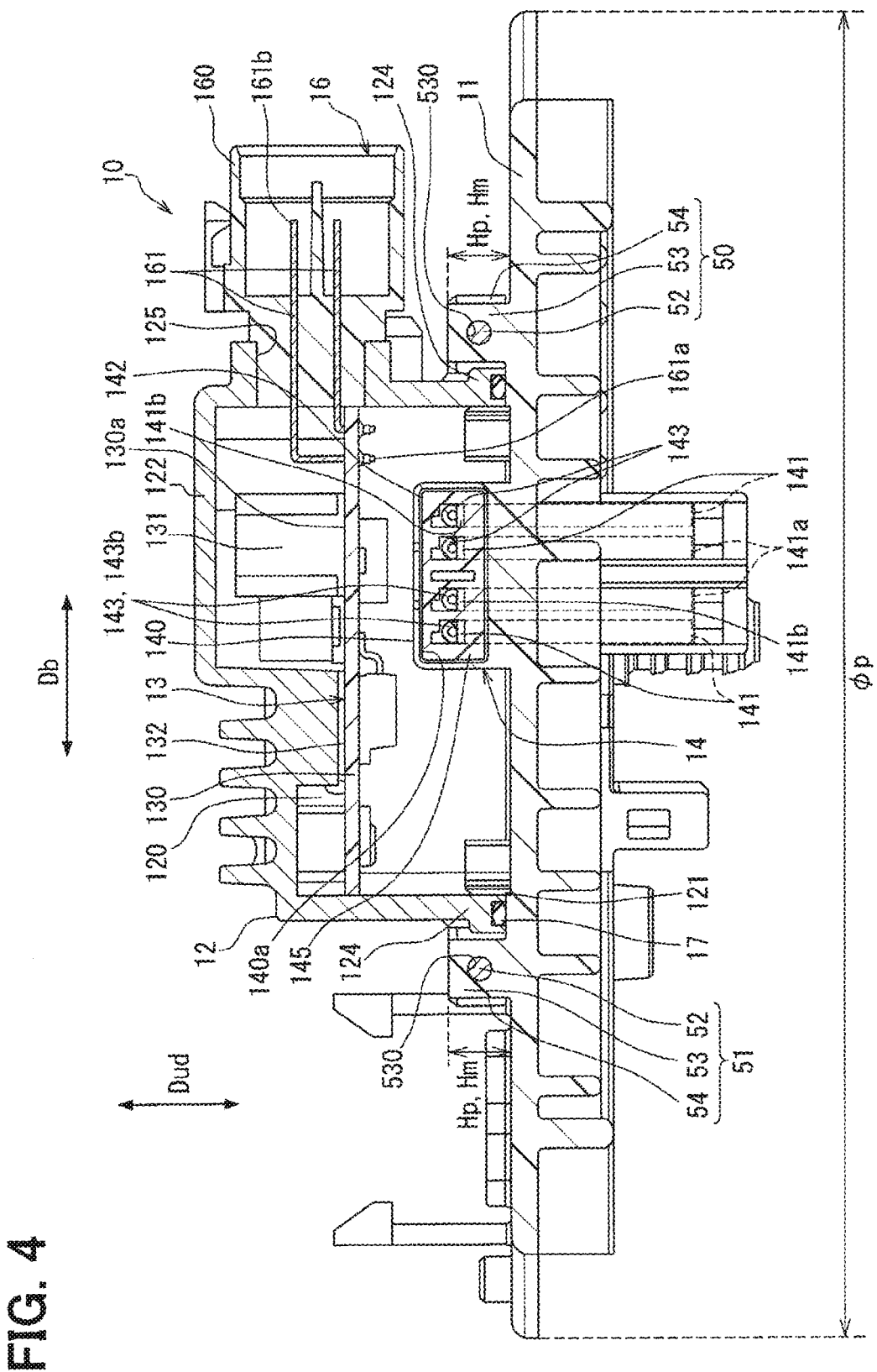
FIG. 4 is a cross-sectional view illustrating a tank lid unit in FIG. 1 and taken alone a line IV-IV in FIG. 7.
Figure 5:
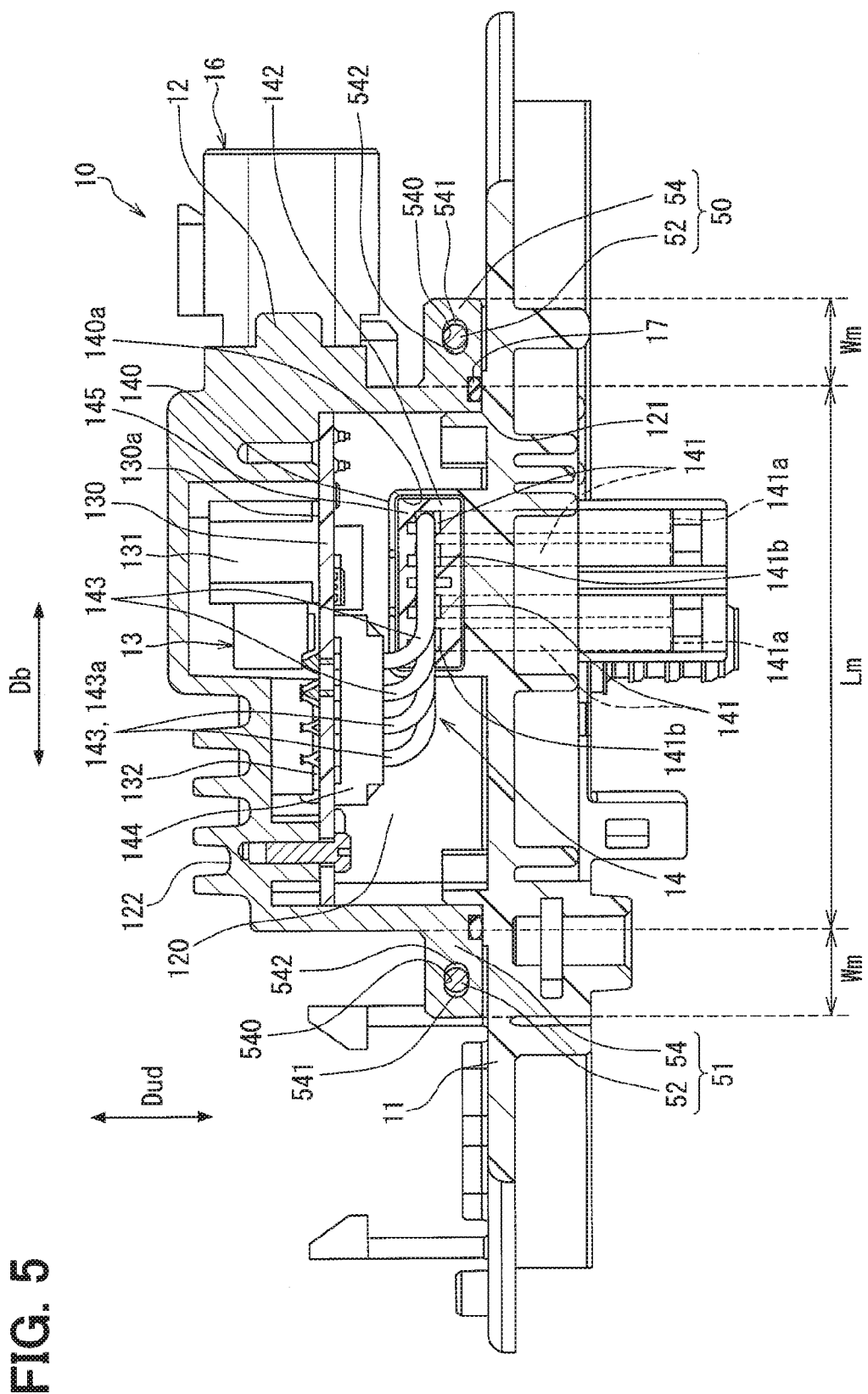
FIG. 5 is a cross-sectional view illustrating a tank lid unit in FIG. 1 and taken alone a line V-V in FIG. 7.
Figure 6:
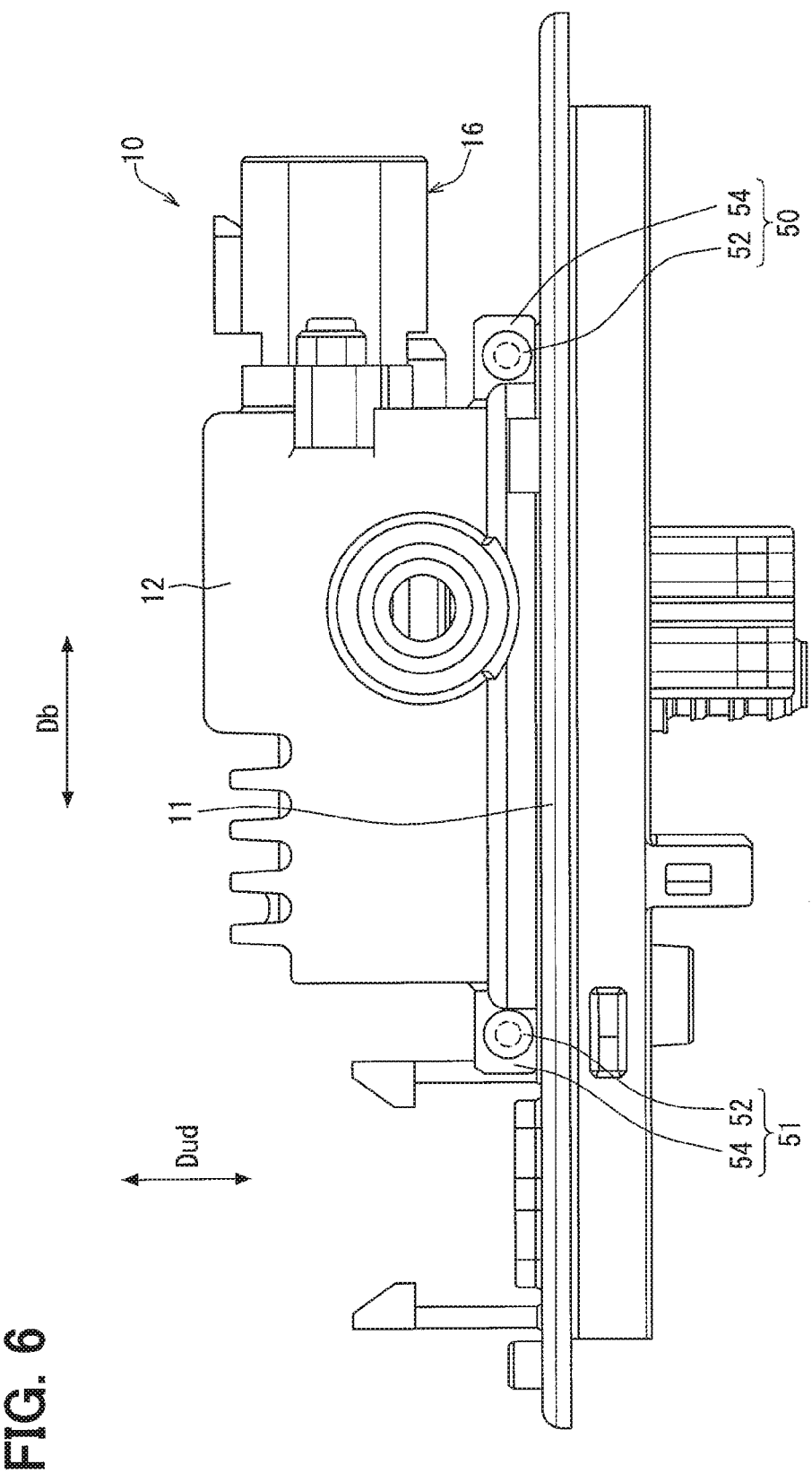
FIG. 6 is a front view illustrating a tank lid unit of FIG. 1.

As illustrated in FIGS. 3 to 5, the metal housing 12 is made of a metal material such as aluminum excellent in heat dissipation property in a rectangular tube shape with an inverted bottom. The metal housing 12 is assembled outside the fuel tank 2 above the resin lid main body 11 so that an opening portion 121 faces downward. In the metal housing 12, the opening portion 121 is closed by the resin lid main body 11, thereby defining an accommodation space 120 inside.

The drive circuit 13 is accommodated in an accommodation space 120 in the metal housing 12 as an electronic circuit for driving a fuel pump 42 of the pump unit 40. The drive circuit 13 is configured such that multiple circuit elements such as an electrolytic capacitor 131 and an IC 132 are mounted on a circuit board 130. In this example, the circuit board 130 is a printed wiring board such as a glass epoxy board, and is shaped in a rectangular plate-like shape. The circuit board 130 is screwed to an upper bottom portion 122 of the metal housing 12 from below so that the circuit board 130 is biased to the upper bottom portion 122 side above the resin lid main body 11 in the metal housing 12. The electrolytic capacitor 131 is of an electrolytic solution type such as an aluminum electrolytic capacitor, and is formed in a columnar shape. The electrolytic capacitor 131 is mounted on an upper surface 130a of the circuit board 130 which faces upward, so that the electrolytic capacitor 131 is disposed with a gap to the upper bottom portion 122 of the metal housing 12. The IC 132 is an electronic component packaged by resin sealing, and is shaped in a flat rectangular piece. The IC 132 is mounted on the upper surface 130a of the circuit board 130 and comes into contact with the upper bottom portion 122 of the metal housing 12, so that the IC 132 can radiate heat through the upper bottom portion 122.

The internal connection structure 14 includes a resin connector 140, metal terminals 141, and a flexible cable 142. The resin connector 140 is made of the same resin material as that of the resin lid main body 11, and formed integrally with the resin lid main body 11. The resin connector 140 is disposed below the circuit board 130 in the accommodation space 120 in the metal housing 12. The resin connector 140 according to the present embodiment is located directly under the electrolytic capacitor 131 across the circuit board 130. As illustrated in FIGS. 4 and 5, in the resin connector 140, a lateral hole 140a opened laterally in a rectangular hole shape is provided above the resin lid main body 11. With the resin connector 140 configured as described above, a portion of the resin lid main body 11 where the lateral hole 140a is provided is covered with the upper circuit board 130 located above.

Multiple metal terminals 141 are provided at predetermined intervals from each other and buried across the resin lid main body 11 and the resin connector 140 by insert resin molding. Each of the metal terminals 141 is made of a metal material such as plated brass and shaped in an elongated rectangular piece. A lower end portion 141a of each metal terminal 141 protrudes downward from the resin lid main body 11 in the fuel tank 2 so as to be used for electrical connection with the fuel pump 42 in the pump unit 40. An upper end portion 141b of each metal terminal 141 is bent in an L shape toward an inner peripheral side of the lateral hole 140a in the metal housing 12 so as to be used for electrical connection with the flexible cable 142.

As illustrated in FIGS. 3 to 5, the flexible cable 142 is configured by bundling multiple flexible lead wires 143 with a pair of common connectors 144 and 145. Each of the flexible lead wires 143 is configured by coating a metal wiring such as copper with a resin material such as fluororesin, and has flexibility that is freely bendable. Each of the flexible lead wires 143 is bent into an L shape in the metal housing 12.

As illustrated in FIG. 5, the first common connector 144 is made of a resin material such as a polyamide resin and shaped in a rectangular block. The first common connector 144 is fixedly fitted to the circuit board 130 in the metal housing 12 from a lower side of the first common connector 144. Along with this configuration, the first common connector 144 holds a first end portion 143a of each flexible lead wire 143 in a partially buried state. The first end portion 143a of each flexible lead wire 143 is soldered to a printed wiring of the circuit board 130 in the above holding manner so that the first end portion 143a is electrically connected to the drive circuit 13.

As illustrated in FIGS. 4 and 5, the second common connector 145 is made of a resin material such as a polybutylene terephthalate resin (PBT) and shaped in a rectangular block. The second common connector 145 is fixedly fitted to the resin connector 140 by being laterally inserted into the lateral hole 140a in the metal housing 12. Along with this configuration, the second common connector 145 holds a second end portion 143b of each flexible lead wire 143 in a partially buried state. The second end portion 143b of each flexible lead wire 143 is inserted into the lateral hole 140a from the side together with the second common connector 145 in the above holding state and attached to the resin connector 140. As a result, the second end portion 143b of each flexible lead wire 143 is electrically connected to the corresponding metal terminal 141.

With the above configuration, as illustrated in FIG. 5, the flexible cable 142 is disposed in the metal housing 12 in a relaxed state in which each of the flexible lead wires 143 is relaxed between the common connectors 144 and 145.

As illustrated in FIGS. 3 and 4, the external connection structure 16 has an external connector 160 and external terminals 161. The external connector 160 is made of a resin material such as a polyamide resin and shaped in a rectangular tube separate from the resin lid main body 11. The external connector 160 is fixedly fitted to a side portion 124 of the metal housing 12 outside of the fuel tank 2, to thereby close a connector port 125 penetrating through the side portion 124. With the above closing configuration, the external connector 160 protrudes from the metal housing 12 to the side outside of the fuel tank 2.

Multiple external terminals 161 are provided at predetermined intervals from each other and buried in the external connector 160 by insert resin molding. Each of the external terminals 161 is made of a metal material such as tin-plated brass and shaped in an elongated rectangular piece. An inner end portion 161a of each external terminal 161 is electrically connected to the drive circuit 13 by being soldered to the printed wiring of the circuit board 130 inside of the metal housing 12. An outer end portion 161b of each external terminal 161 protrudes to an inner peripheral side of the external connector 160 outside of the fuel tank 2 so that the outer end portion 161b can be electrically connected to an engine control circuit of the vehicle. With the above electrical connection configuration, the drive circuit 13 generates a drive signal for controlling the drive of the fuel pump 42 according to a command signal from the engine control circuit.

As illustrated in FIGS. 3 to 5, the buffer member 17 is made of an elastic material such as fluororubber and formed in a rectangular annular shape. The buffer member 17 is attached to the opening portion 121 of the metal housing 12, so that the buffer member 17 is interposed over an entire periphery between the resin lid main body 11 and the metal housing 12. With the above interposing configuration, the buffer member 17 exhibits a buffer function for absorbing a shock between the resin lid main body 11 and the metal housing 12, thereby being capable of reducing a shock transmission from the fuel pump 42 to the drive circuit 13. At the same time, the buffer member 17 exerts a sealing function for sealing between the resin lid main body 11 and the metal housing 12, thereby being capable of protecting the drive circuit 13 and the respective metal terminals 141 from a liquid such as moisture outside of the metal housing 12.

Figure 2:
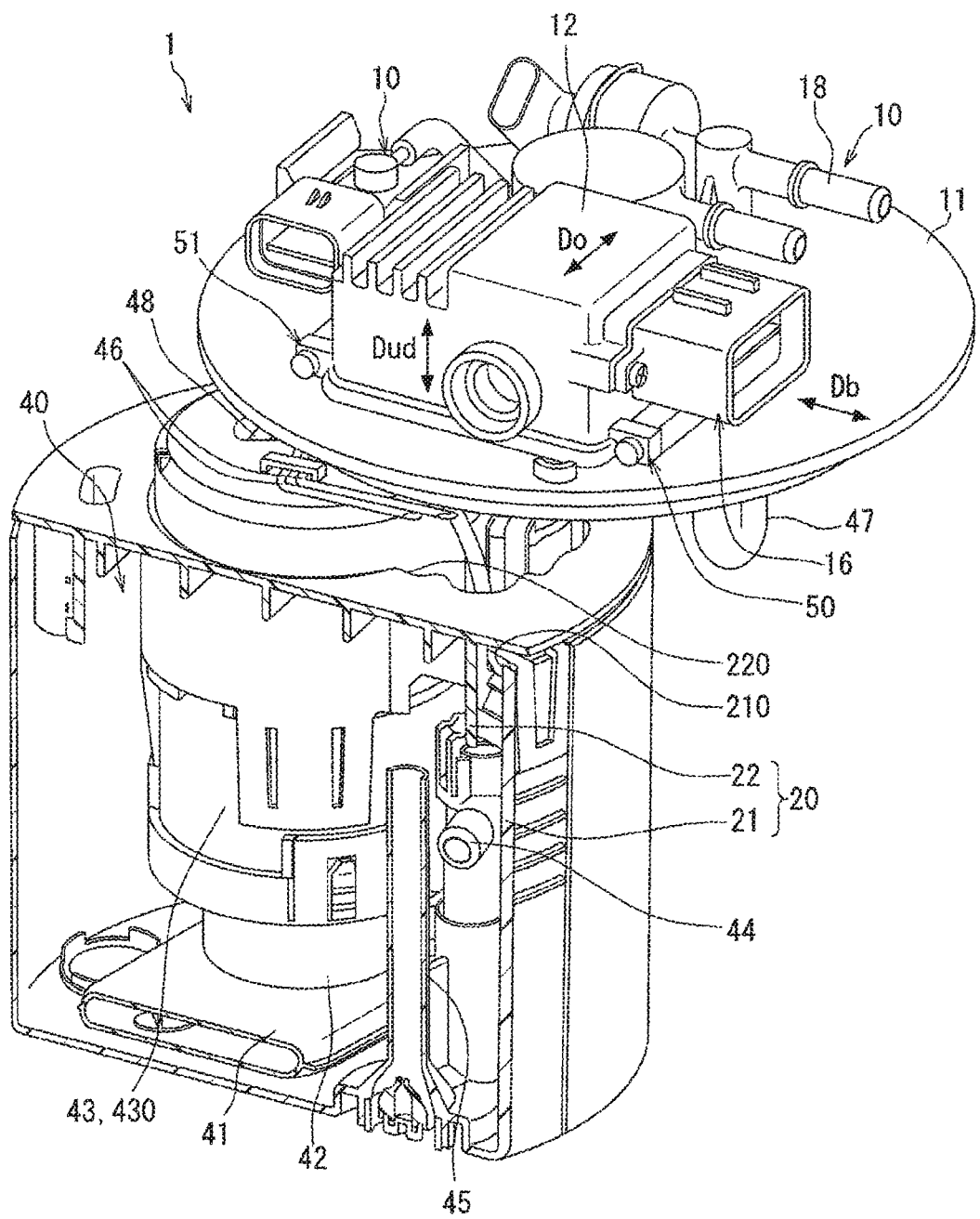
FIG. 2 is a partially sectional perspective view illustrating the fuel supply device of FIG. 1.

As illustrated in FIGS. 1 to 3, the fuel discharge pipe 18 is made of the same resin material as that of the resin lid main body 11, and formed integrally with the resin lid main body 11. The fuel discharge pipe 18 protrudes downward from the resin lid main body 11 in the fuel tank 2 so as to be coupled to a fuel filter 43 of the pump unit 40. At the same time, the fuel discharge pipe 18 protrudes upward from the resin lid main body 11 outside of the fuel tank 2 so as to be connected to a fuel supply pipe of the internal combustion engine. With the above connection configuration, the fuel discharged from the fuel pump 42 through the fuel filter 43 in the pump unit 40 is supplied from the fuel tank 2 toward the internal combustion engine outside of the tank 2.

The sub-tank 20 includes a tank main body 21 and a holding cover 22. The tank main body 21 is made of a resin material such as POM and formed into a bottomed cylindrical shape that is separate from the resin lid main body 11. As illustrated in FIG. 1, the tank main body 21 is installed on a bottom portion 2c of the fuel tank 2. The tank main body 21 stores a fuel which is transferred from an inside of the fuel tank 2 by a jet pump 45 in the pump unit 40.

As illustrated in FIGS. 1 to 3, the holding cover 22 is made of a resin material such as POM and formed into a lid shape that is separate from the resin lid main body 11. The holding cover 22 is attached to the tank main body 21 to close the opening portion 210 of the tank main body 21 in the fuel tank 2. The holding cover 22 includes a holding hole 220 that penetrates the holding cover 22 in the vertical direction Dud.

As illustrated in FIG. 1, the adjustment mechanism 30 includes a support 31 and an urging member 32. The support column 31 is made of a metal material such as stainless steel, formed in a cylindrical shape, and is disposed to extend in the vertical direction Dud. The support column 31 is fixedly fitted to the resin lid main body 11 in the fuel tank 2. The support column 31 is slidably supported by the holding cover 22 below the resin lid main body 11 so that the support column 31 can move relative to the sub-tank 20 in the vertical direction Dud. The urging member 32 is made of a metal material such as iron, formed in a coil spring shape, and is interposed between the accommodation portion 221 and the resin lid main body 11 on the outer peripheral side of the support column 31. The urging member 32 with the above interposed configuration urges the sub-tank 20 toward the bottom portion 2c of the lower portion of the fuel tank 2.

As illustrated in FIGS. 1 to 3, the pump unit 40 is accommodated in the sub-tank 20 except for an upper portion of the pump unit 40. The pump unit 40 includes a suction filter 41, the fuel pump 42, the fuel filter 43, a pressure regulator 44, and the jet pump 45.

The suction filter 41 is provided on a lowermost portion of the pump unit 40. The suction filter 41 is connected to an intake port of the fuel pump 42. The suction filter 41 filters the fuel suctioned from an inside of the sub-tank 20 into the fuel pump 42 to remove large foreign materials in the fuel. The fuel pump 42 is provided above the suction filter 41 in the pump unit 40. The fuel pump 42 is electrically connected to the respective metal terminals 141 through multiple flexible lead wires 46 that are freely bent so as to be also electrically connected to the respective flexible lead wires 143 and the drive circuit 13. The fuel pump 42 electrically connected as described above receives a drive signal from the driver circuit 13 to pressurize and discharge the intake fuel from the suction filter 41.

The fuel filter 43 is provided around the fuel pump 42 in the pump unit 40. In the fuel filter 43, a filter element 431 such as a honeycomb filter medium is accommodated in a filter case 430. The filter case 430 is held by an inner peripheral portion of the holding hole 220 in a state where the filter case 430 penetrates the holding cover 22 in the vertical direction Dud. In addition, the filter case 430 is coupled to a discharge port of the fuel pump 42 on an upstream side, and is coupled to the fuel discharge pipe 18 through a flexible tube 47 which is freely bent on a downstream side. The fuel filter 43 coupled as described above filters the fuel which is discharged from the fuel pump 42 into the filter case 430 and flows toward the fuel discharge pipe 18 by the aid of the filter element 431 and removes minute foreign materials in the fuel. The fuel filtered as described above is supplied to the internal combustion engine through the fuel discharge pipe 18.

The pressure regulator 44 is provided on a side of the fuel filter 43 in the pump unit 40. The pressure regulator 44 is coupled to a portion of the filter case 430 where a fuel passage extended toward the fuel discharge pipe 18 is provided, through a flexible tube 48 that is freely bent. The pressure regulator 44 adjusts a pressure of the fuel which is supplied from the fuel filter 43 to the fuel discharge pipe 18. The jet pump 45 is provided at a side of the fuel filter 43 in the pump unit 40. The jet pump 45 is coupled to a discharge port through which an excess fuel is discharged when a pressure is adjusted in the pressure regulator 44. The jet pump 45 generates a negative pressure by injection of the excess fuel discharged from the pressure regulator 44, and transfers the fuel in the fuel tank 2 to the sub-tank 20.

(Assembling Structure)

Next, as illustrated in FIGS. 1 to 8, assembling structures 50 and 51 for assembling the metal housing 12 above the resin lid main body 11 will be described. In this example, a lateral direction illustrated in FIGS. 4 to 7 is defined as a reference radial direction Db (refer also to FIGS. 1 to 3 and 8) which is a reference of the assembling structures 50 and 51 in an arbitrary radial direction of the resin lid main body 11. The reference radial direction Db is substantially perpendicular to the vertical direction Dud of the fuel supply device 1, and as illustrated in FIG. 4, in the present embodiment, the external connector 160 is fitted into the connector port 125 of the metal housing 12 along the reference radial direction Db. As illustrated in FIG. 3, in the present embodiment, the second common connector 145 of the flexible cable 142 is fitted into the lateral hole 140a of the resin connector 140 along an orthogonal direction Do (refer also to FIGS. 2, 7, and 8) substantially perpendicular to the vertical direction Dud and the reference radial direction Db.

As illustrated in FIGS. 4 to 8, the first assembling structure 50 is disposed on a protruding side of the external connector 160 of both sides sandwiching the metal housing 12 in the reference radial direction Db. The first assembling structure 50 includes a metal rod 52, a resin protrusion 53, and metal protrusions 54. The metal rod 52 is formed in an elongated columnar shape, and made of a metal material such as stainless steel having a thermal expansion coefficient smaller than that of the metal material forming the metal housing 12. More specifically, a linear expansion coefficient of the metal rod 52 in the reference radial direction Db is set to be smaller than the linear expansion coefficient of the metal housing 12 in the same direction Db.

Figure 7:
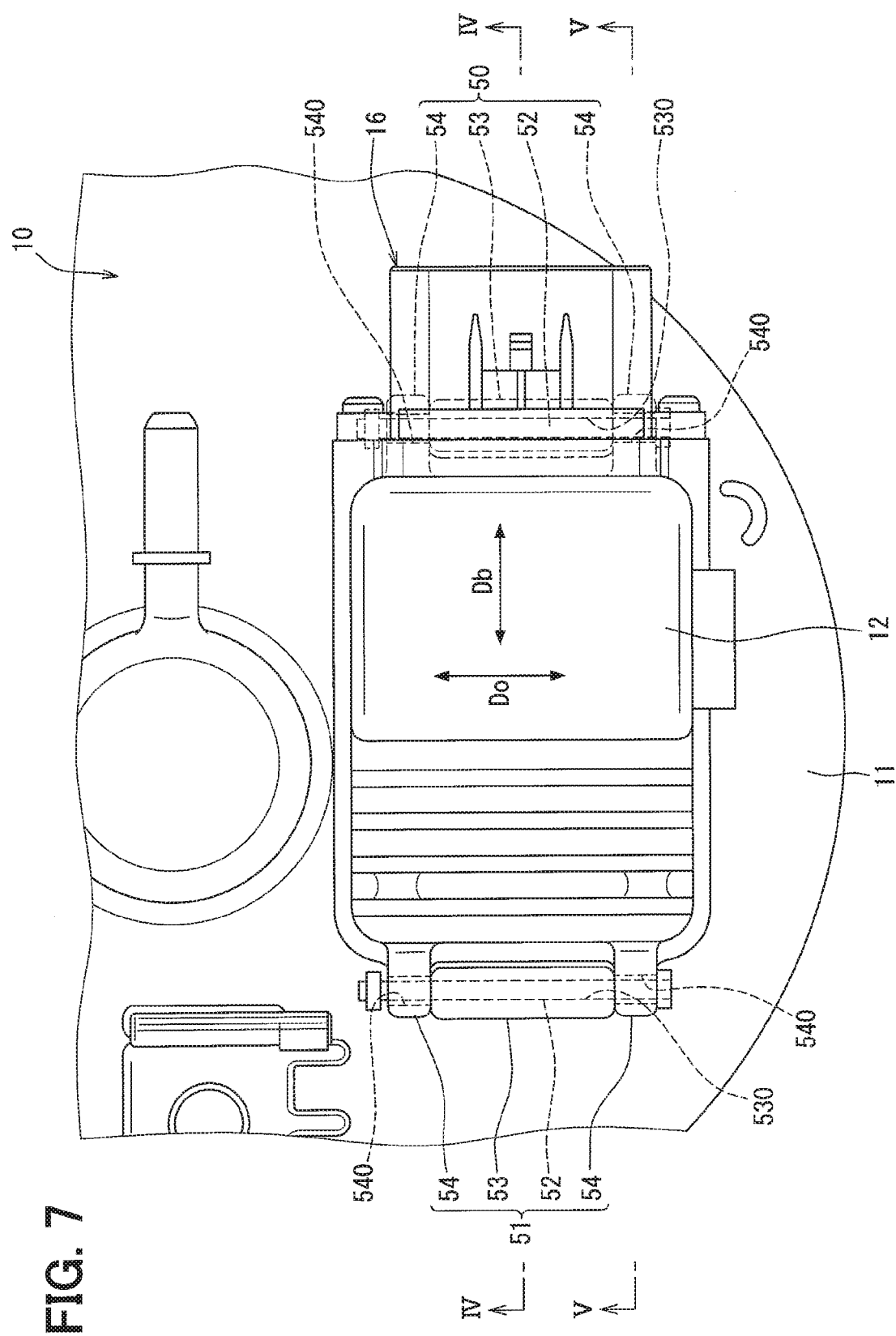
FIG. 7 is a top view illustrating the tank lid unit of FIG. 1.
Figure 8:
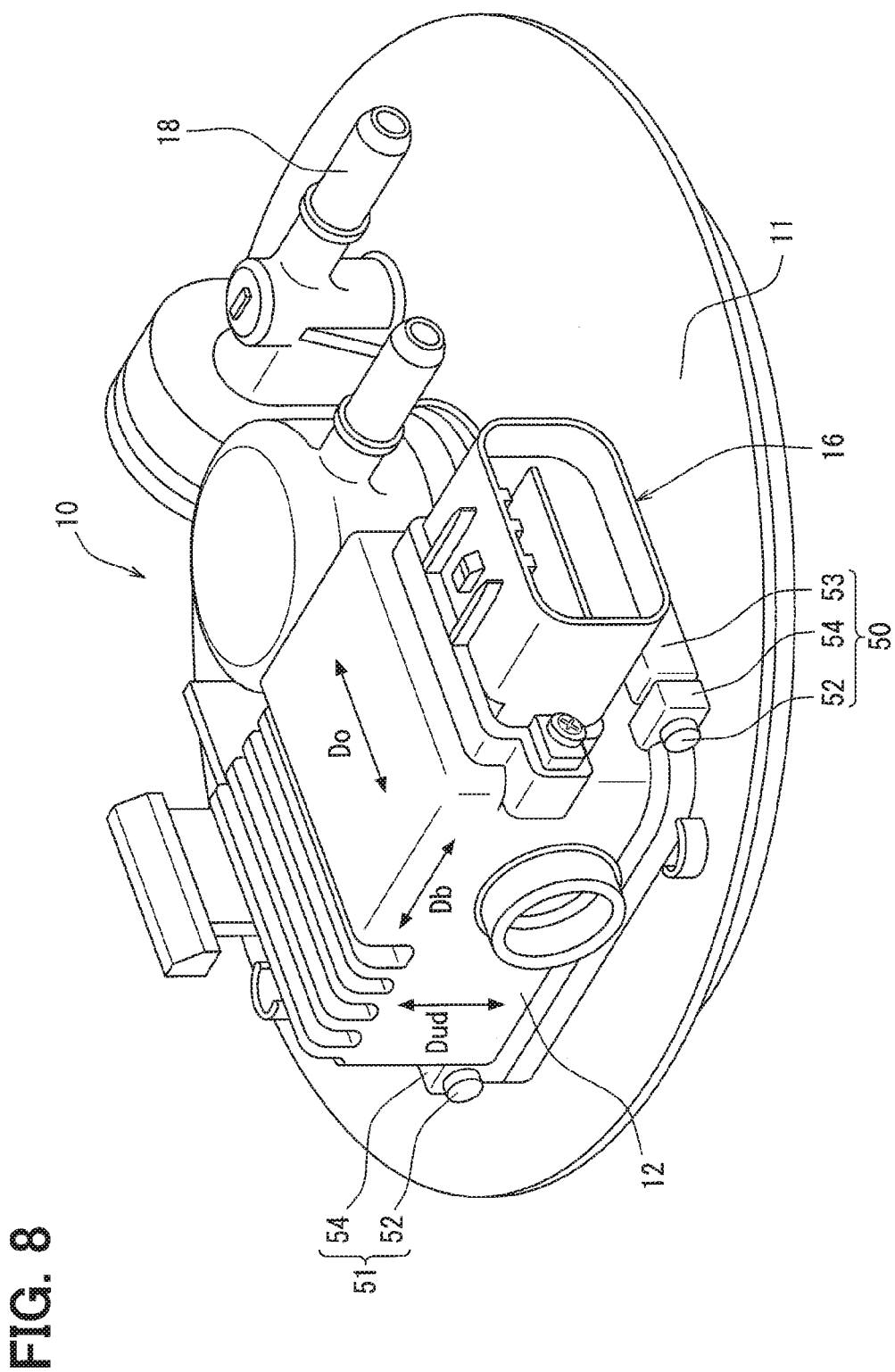
FIG. 8 is a perspective view illustrating the tank lid unit of FIG. 1.

As illustrated in FIGS. 4, 7, and 8, the resin protrusion 53 is made of the same resin material as that of the resin lid main body 11, that is, a resin material having a thermal expansion coefficient larger than that of the metal housing 12 and the metal rod 52, and formed in a rectangular columnar shape integrally with the resin lid main body 11. More specifically, the linear expansion coefficient of the resin protrusion 53 in the reference radial direction Db is set to be larger than the linear expansion coefficient of each of the metal housing 12 and the metal rod 52 in the same direction Db.

As illustrated in FIG. 4, the resin protrusion 53 protrudes upward from the resin lid main body 11 at a position spaced away from the side portion 124 of the metal housing 12 laterally along the reference radial direction Db out of the fuel tank 2. In this example, a projection dimension Hp of the resin protrusion 53 from the resin lid main body 11 in the vertical direction Dud is set to be sufficiently smaller than an outer diameter dimension (diameter dimension) φp of the resin lid main body 11 in the reference radial direction Db.

As illustrated in FIGS. 4 and 7, a fitting hole 530 penetrates through a resin protrusion 53 in a cylindrical hole shape extending along the orthogonal direction Do. The metal rod 52 is inserted through each of the fitting hole 530 coaxially along the orthogonal direction Do. In this example, an inner diameter dimension (diameter dimension) of the fitting hole 530 is set to be substantially the same as or slightly larger than an outer diameter dimension (diameter dimension) of the metal rods 52. By the insertion with the above setting, the metal rod 52 fixedly fitted in the fitting hole 530 is sandwiched between the fitting hole 530 from both sides in the reference radial direction Db and from both sides in the vertical direction Dud.

As illustrated in FIGS. 4 to 8, the metal protrusions 54 are made of the same metal material as that of the metal housing 12, that is, a metal material having a thermal expansion coefficient smaller than that of the resin lid main body 11 and larger than that of the metal rod 52, and formed in a rectangular columnar shape integrally with the metal housing 12. More specifically, the linear expansion coefficient of the metal protrusions 54 in the reference radial direction Db is set to be smaller than the linear expansion coefficient of the resin lid main body 11 and larger than the linear expansion coefficient of the metal rod 52 in the same direction Db.

The metal protrusions 54 are provided one by one on both side portions of the resin protrusion 53 in the orthogonal direction Do. As illustrated in FIGS. 4 and 5, each metal protrusion 54 protrudes from the opening portion 121 of the metal housing 12 laterally along the reference radial direction Db outside of the fuel tank 2. As illustrated in FIG. 4, a height dimension Hm from the resin lid main body 11 to an upper surface of each metal protrusion 54 in the vertical direction Dud is set to be substantially the same as a projection dimension Hp of the resin protrusion 53 in the same direction Dud. Further, as illustrated in FIG. 5, a projection dimension Wm of each metal protrusion 54 from the metal housing 12 in the reference radial direction Db is set to be sufficiently smaller than a length dimension Lm of the metal housing 12 in the reference radial direction Db.

As illustrated in FIGS. 5 and 7, the elongated hole 540 penetrates through each metal protrusion 54 along the orthogonal direction Do. The elongated hole 540 is formed in a long round hole shape having a larger length dimension in the reference radial direction Db than a width dimension in the vertical direction Dud. That is, in each metal protrusion 54, a longitudinal direction of the elongated hole 540 is along the reference radial direction Db. The metal rod 52 is inserted through the elongated hole 540 of each metal protrusion 54 along the orthogonal direction Do. In this example, a length dimension of the elongated hole 540 in the reference radial direction Db is set to be sufficiently larger than the outer diameter dimension (diameter dimension) of the metal rod 52. By the insertion under the above setting, as illustrated in FIG. 5, the metal rod 52 is sandwiched by the elongated holes 540 of the respective metal protrusions 54 from both sides in the vertical direction Dud, and gaps 541 and 542 are provided on both sides in the reference radial direction Db between the protrusion 54 and the elongated hole 540. Specifically, each gap 541 is secured by the metal rod 52 on the side opposite to the metal housing 12 in the elongated hole 540 of each metal protrusion 54. On the other hand, the gap 542 is ensured by the metal rod 52 on the metal housing 12 side in the elongated hole 540 of each metal protrusion 54. Both end portions of the metal rod 52 projecting from the elongated hole 540 of each metal protrusion 54 to the side opposite to the resin protrusion 53 enlarge the outer diameter dimension (diameter dimension) by forming a head portion and fixing the holding ring.

As illustrated in FIGS. 4 to 8, the second assembling structure 51 is disposed on the side opposite to the first assembling structure 50 of both sides sandwiching the metal housing 12 in the reference radial direction Db. The second assembling structure 51 has the same structure as the first assembling structure 50 except that the positional relationship of the gaps 541 and 542 with the metal rod 52 is reversed in FIG. 5. Therefore, the same reference numerals as those of the first assembling structure 50 denotes the components of the second assembling structure 51, and a detailed description of the second assembling structure 51 will be omitted.

Figure 9:
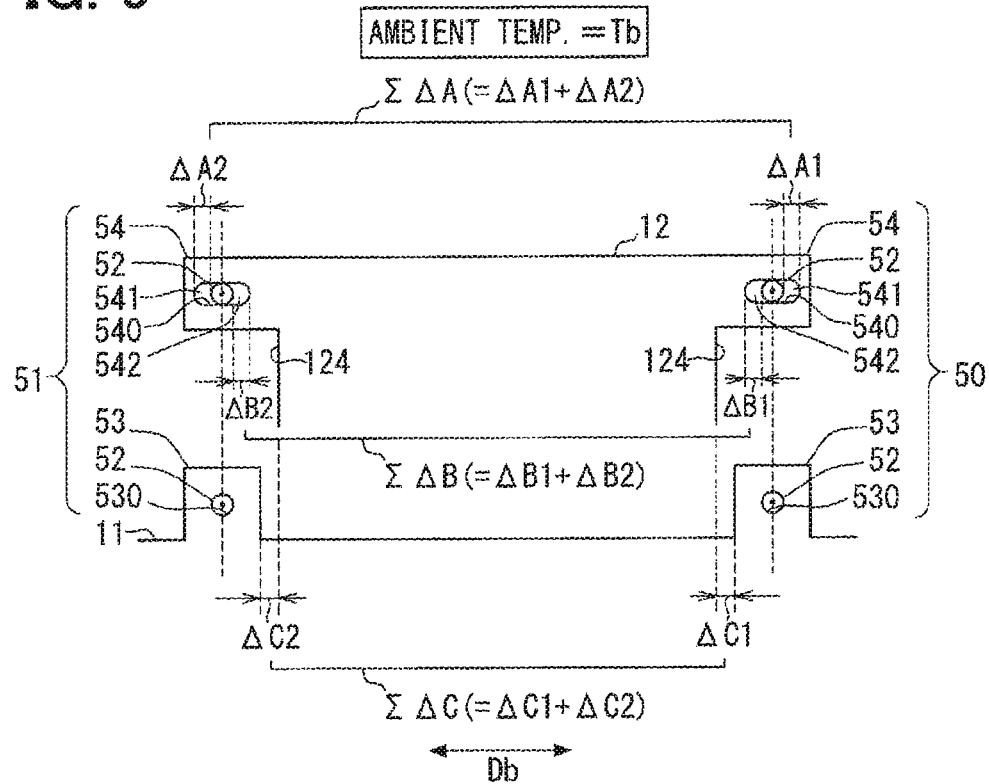
FIG. 9 is a schematic view for illustrating a first assembling structure and a second assembling structure of FIG. 1.

As illustrated in FIG. 9, in the assembling structures 50 and 51 described above, a reference temperature Tb set to a normal temperature such as 25° C. is defined as the ambient temperature outside of the fuel tank 2 (hereinafter simply referred to as "ambient temperature"). Further, in each of the assembling structures 50 and 51 in which the ambient temperature is the reference temperature Tb, spacing dimensions of the gaps 541 provided by the metal rod 52 in the holes 530 and 540 on the opposite side to the metal housing 12 are represented by ΔA1 and ΔA2, respectively. Further, in each of the assembling structures 50 and 51 in which the ambient temperature has reached the reference temperature Tb, spacing dimensions of the gaps 542 provided by the metal rod 52 in the holes 530 and 540 on the metal housing 12 side are represented by ΔB1 and ΔB2, respectively. Further, in each of the assembling structures 50 and 51 in which the ambient temperature has reached the reference temperature Tb, spacing dimensions from the resin protrusion 53 to the side portion 124 of the metal housing 12 are defined as ΔC1 and ΔC2, respectively.

Figure 10:
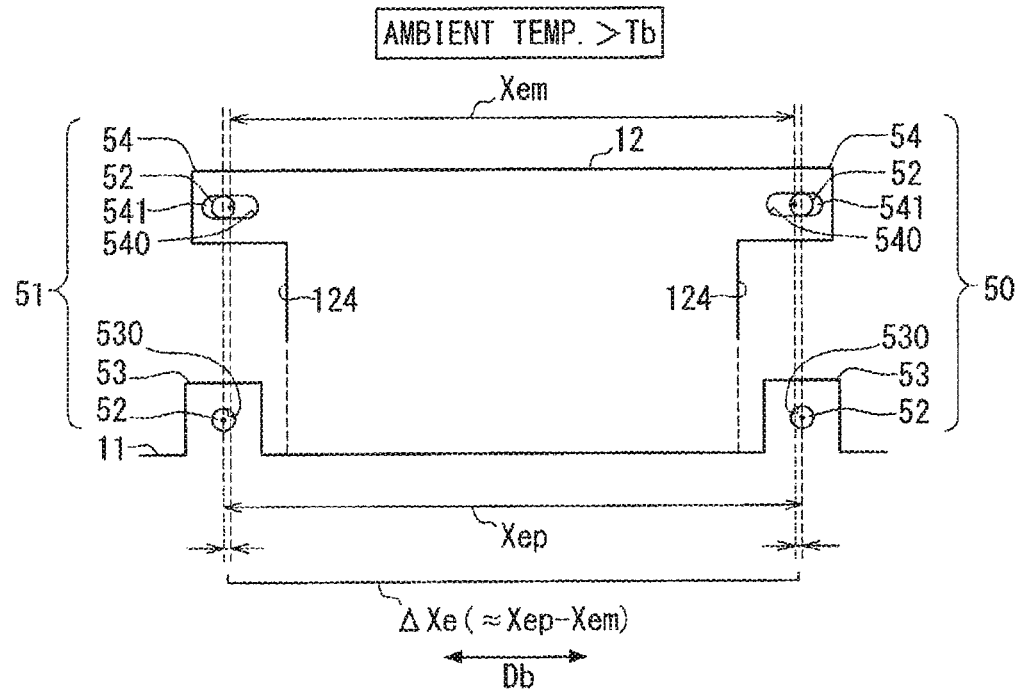
FIG. 10 is a schematic view for illustrating the first assembling structure and the second assembling structure of FIG. 1.

Under such a definition, as illustrated in FIG. 10, when the ambient temperature exceeds the reference temperature Tb, the resin lid main body 11 thermally expands more than the metal housing 12. As a result, a center-to-center distance Xep between the fitting holes 530 sandwiching the resin lid main body 11 in the reference radial direction Db in each of the assembling structures 50 and 51 is set to be larger than a center-to-center distance Xem between the elongated holes 540 that sandwich the metal housing 12 in the reference radial direction Db in each of the assembling structures 50 and 51. In this example, a difference (=Xep−Xem) between the center-to-center distances Xep and Xem in the reference radial direction Db can be substantially approximated to a difference in the thermal expansion amount ΔXe between the resin lid main body 11 and the metal housing 12 according to a relationship of the respective dimensions Hp and φp and a relationship of the respective dimensions Hm and Lm described above.

Therefore, in the first embodiment, as illustrated in FIG. 9, a total dimension ΣΔA (=ΔA1+ΔA2) of the spacing dimension ΔA1 of the gap 541 provided by the metal rod 52 on the side opposite to the metal housing 12 in the assembling structure 50 and the spacing dimension ΔA2 of the gap 541 provided by the metal rod 52 on the side opposite to the metal housing 12 in the assembling structure 51 is set to be larger than a maximum predicted value of the difference in the thermal expansion amount ΔXe when the ambient temperature exceeds the reference temperature Tb. In this example, as the maximum predicted value of the difference in the thermal expansion amount ΔXe, the difference in the thermal expansion amount ΔXe predicted to be the maximum at a maximum temperature such as 80° C. which the ambient temperature is supposed to reach is employed.

Figure 11:
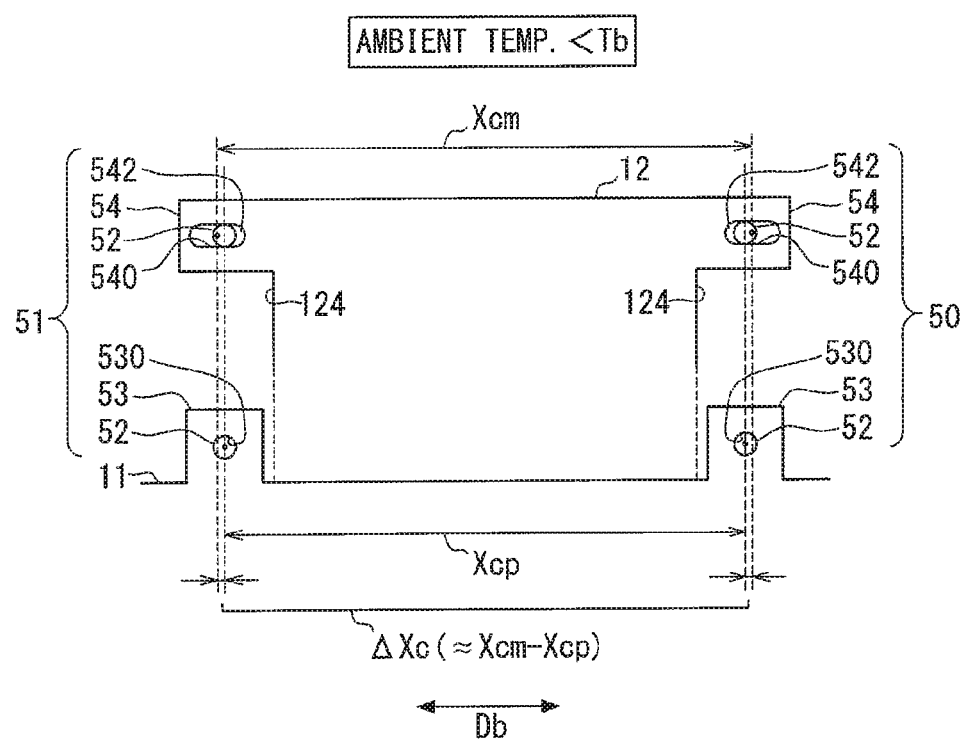
FIG. 11 is a schematic view for illustrating the first assembling structure and the second assembling structure of FIG. 1.

On the other hand, as illustrated in FIG. 11, when the ambient temperature falls below the reference temperature Tb, the resin lid main body 11 thermally shrinks more than the metal housing 12. As a result, a center-to-center distance Xcp between the fitting holes 530 sandwiching the resin lid main body 11 in the reference radial direction Db in each of the assembling structures 50 and 51 is set to be smaller than a center-to-center distance Xcm between the elongated holes 540 that sandwich the metal housing 12 in the reference radial direction Db in each of the assembling structures 50 and 51. In this example, a difference (=Xcm−Xcp) between the center-to-center distances Xcp and Xcm in the reference radial direction Db can be substantially approximated to a difference in the thermal shrinkage amount ΔXc between the resin lid main body 11 and the metal housing 12 according to a relationship of the respective dimensions Hp and φp and a relationship of the respective dimensions Hm and Lm described above.

Therefore, in the first embodiment, as illustrated in FIG. 9, a total dimension ΣΔB (=ΔB1+ΔB2) of the spacing dimension ΔB1 of the gap 542 provided by the metal rod 52 on the metal housing 12 side in the assembling structure 50 and the spacing dimension ΔB2 of the gap 542 provided by the metal rod 52 on the metal housing 12 side in the assembling structure 51 is set to be larger than a maximum predicted value of the difference in the thermal shrinkage amount ΔXc when the ambient temperature falls below the reference temperature Tb. At the same time, in the first embodiment, as illustrated in FIG. 9, a total dimension ΣΔC (=ΔC1+ΔC2) of the spacing dimension ΔC1 between the resin protrusion 53 and the side portion 124 of the metal housing 12 in the assembling structure 50 and the spacing dimension ΔC2 between the resin protrusion 53 and the side portion 124 of the metal housing 12 in the assembling structure 51 is set to be larger than a maximum predicted value of the difference in the thermal shrinkage amount ΔXc when the ambient temperature falls below the reference temperature Tb. In this example, as the maximum predicted value of the difference in the thermal shrinkage amount ΔXc, the difference in the thermal shrinkage amount ΔXc predicted to be the maximum at a minimum temperature such as −40° C. which the ambient temperature is supposed to reach is employed.

(Operational Effects)

The operational effects of the above-described first embodiment will be described.

According to the first embodiment, in the assembling structures 50 and 51 on both sides of the metal housing 12 in the reference radial direction Db of the resin lid main body 11, the resin protrusion 53 integral with the resin lid main body 11 and the metal protrusion 54 integral with the metal housing 12 are protruded upward and laterally along the reference radial direction Db, respectively. In each of the assembling structures 50 and 51 described above, the metal rod 52 that is inserted through the resin protrusion 53 and is fixedly fitted to the resin protrusion 53 is also inserted through the metal protrusion 54. As a result, the gaps 541 and 542 are provided in the reference radial direction Db between the metal rod 52 and the metal protrusion 54.

For that reason, when the resin lid main body 11 and the metal housing 12 are thermally expanded or thermally shrunk, the positional deviation between the resin protrusion 53 and the metal protrusion 54 is enabled according to the gaps 541 and 542 in each of the assembling structures 50 and 51. Further, in each of the assembling structures 50 and 51, the metal rod 52 inserted through and fixedly fitted to the resin protrusion 53 is also inserted through the metal protrusion 54, to thereby separate the resin protrusion 53 and the metal housing 12 from each other. For that reason, when the resin lid main body 11 and the metal housing 12 thermally shrink, the positional deviation between the metal housing 12 and the resin protrusion 53 in each of the assembling structures 50 and 51 is enabled according to the separation.

Therefore, the total dimension ΣΔA of the spacing dimensions ΔA1 and ΔA2 of the gap 541 provided by the metal rod 52 on the side opposite to the metal housing 12 in both of the assembling structures 50 and 51 is defined. Under the above definition, the total dimension ΣΔA is set to be larger than the difference in the thermal expansion amount ΔXe between the resin lid main body 11 and the metal housing 12 in the reference radial direction Db when the ambient temperature exceeds the reference temperature Tb. As a result, in each of the assembling structures 50, and 51 even if the ambient temperature increases and exceeds the reference temperature Tb, the positional deviation of the resin protrusion 53 from the metal protrusion 54 together with the metal rod 52 to the side opposite to the metal housing 12 is acceptable in the reference radial direction Db due to the gap 541 of the total dimension ΣΔA larger than the difference in the thermal expansion amount ΔXe. Therefore, when the ambient temperature exceeds the reference temperature Tb, the damage of a portion of the resin lid main body 11 to which the metal housing 12 is assembled can be reduced.

The total dimensions ΣΔB and ΣΔC of each of the spacing dimensions ΔB1 and ΔB2 of the gap 542 provided by the metal rod 52 on the metal housing 12 side and the spacing dimensions ΔC1 and ΔC2 between the resin protrusion 53 and the metal housing 12 in both of the assembling structures 50 and 51 are defined. Under the above definitions, the total dimensions ΣΔB and ΣΔC are set to be larger than the difference in the thermal shrinkage amount ΔXc between the resin lid main body 11 and the metal housing 12 in the reference radial direction Db when the ambient temperature falls below the reference temperature Tb. As a result, in each of the assembling structures 50 and 51, even if the ambient temperature decreases and falls below the reference temperature Tb, the positional deviation of the resin protrusion 53 from the metal protrusion 54 together with the metal rod 52 to the metal housing 12 side is acceptable in the reference radial direction Db due to the gap 542 of the total dimension ΣΔB larger than the difference in the thermal shrinkage amount ΔXc. At the same time, in each of the assembling structures 50 and 51, even if the ambient temperature decreases and falls below the reference temperature Tb, the positional deviation of the resin protrusion 53 together with the metal rod 52 to the metal housing 12 side is acceptable in the reference radial direction Db due to the separation of the total dimension ΣΔC larger than the difference in the thermal shrinkage amount ΔXc. As a result, even when the ambient temperature falls below the reference temperature Tb, the damage of a portion of the resin lid main body 11 to which the metal housing 12 is assembled can be reduced.

As described above, according to the first embodiment, with the tank lid unit 10 employing the dimension setting as described above and the fuel supply device 1 provided with the tank lid unit 10, the positional deviation of the resin protrusion 53 from the metal protrusion 54 and the metal housing 12 is permissible in the reference radial direction Db and the effect of reducing the damage can be exerted.

Furthermore, as in the first embodiment, the buffer member 17 for absorbing the shock between the resin lid main body 11 and the metal housing 12 above the resin lid main body 11 is made of an elastic material so as to generate an elastic restoring force for pressing the metal housing 12 upward. Therefore, in each of the assembling structures 50 and 51, an elongated hole 540 in which a longitudinal direction of the metal protrusion 54 is along the reference radial direction Db is adopted. Specifically, the elongated hole 540 provides the gaps 541 and 542 in the reference radial direction Db by insertion of the metal rod 52 into the elongated hole 540, and the metal rod 52 is sandwiched from both sides of the metal rod 52 in the vertical direction Dud. Therefore, even in a state where the metal protrusion 54 is pressed upward by the elastic restoring force received from the buffer member 17 through the metal housing 12, the positional deviation of the metal rod 52 and the resin protrusion 53 from the metal protrusion 54 is restricted in the reference radial direction Db, thereby being capable of enhancing the effect of reducing the damage.

Still further, in each of the assembling structures 50 and 51 according to the first embodiment, the thermal expansion coefficient of the metal material forming the metal rod 52 is set to be smaller than the thermal expansion coefficient of the metal material forming the metal protrusion 54 integrally with the metal housing 12. According to the above configuration, the thermal expansion amount and the thermal shrinkage amount of the metal rod 52 can be reduced as much as possible. Therefore, by setting the dimensions as described above, the positional deviation of the resin protrusion 53 from the metal protrusion 54 and the metal housing 12 is reliably permitted in the reference radial direction Db, thereby being capable of improving the effect of reducing the damage.

In addition, in each of the assembling structures 50 and 51 according to the first embodiment, the projection dimension Hp of the resin protrusion 53 from the resin lid main body 11 in the vertical direction Dud is set to be smaller than the outer diameter dimension φp of the resin lid main body 11 in the reference radial direction Db. As a result, in the vertical direction Dud, since the thermal expansion amount and the thermal shrinkage amount of the resin protrusion 53 can be reduced as much as possible, the damage of the resin protrusion 53 due to the thermal expansion or the thermal shrinkage in the vertical direction Dud can be reduced. Further, even if the thermal expansion amount and the thermal shrinkage amount of the resin lid main body 11 in the reference radial direction Db increases according to the outer diameter dimension φp larger than the projection dimension Hp, since the dimensions are set as described above, the positional deviation of the resin protrusion 53 from the metal protrusion 54 and the metal housing 12 can be permitted in the reference radial direction Db. According to the above configuration, the effect of reducing the damage can be enhanced.

In addition, the first end portion 143a of the flexible cable 142 according to the first embodiment is electrically connected to the drive circuit 13 in the metal housing 12. At the same time, the second end portion 143b of the flexible cable 142 is attached to the resin connector 140 integrated with the resin lid main body 11 in the metal housing 12 so as to be electrically connected to the fuel pump 42 through the metal terminal 141 embedded in the resin lid main body 11. In this example, the flexible cable 142 disposed in a relaxed state due to the flexibility, even if any difference in the thermal expansion amount or any difference in the thermal shrinkage amount occurs between the resin lid main body 11 and the metal housing 12, the positional deviation of the resin protrusion 53 from the metal protrusion 54 and the metal housing 12 is hardly prevented in the reference radial direction Db. Therefore, a situation in which the effect of reducing the damage is hindered by an electric connection structure for electrically connecting the drive circuit 13 to the fuel pump 42 can be avoided.

In addition, in the metal housing 12 according to the first embodiment, the second end portion 143b of the flexible cable 142 is attached to the resin connector 140 below the circuit board 130 on which the electrolytic solution type electrolytic capacitor 131 is mounted in the drive circuit 13. In such a configuration, since the electrolytic capacitor 131 is mounted on the upper surface 130a of the circuit board 130, even if electrolytic solution leaks from the electrolytic capacitor 131 by any chance, the leaked electrolytic solution hardly reaches the resin lid main body 11. In addition, the resin connector 140, which opens the lateral hole 140a into which the second end portion 143b is inserted laterally below the circuit board 130 and above the resin lid main body 11 can cover the portion of the resin lid main body 11 where the lateral hole 140a is provided from the circuit board 130. Therefore, even if the leaked electrolytic solution from the electrolytic capacitor 131 goes downward of the circuit board 130, the leaked electrolytic solution hardly reaches the portion of the resin lid main body 11 covered with the resin connector 140. According to the above configuration, in the resin lid main body 11 to which the metal housing 12 accommodating the electrolytic capacitor 131 is assembled by the assembling structures 50 and 51, a situation in which the resin melt is caused by the leaked electrolytic solution from the electrolytic capacitor 131, and a fuel vapor leak occurs can be prevented.

Second Embodiment

Figure 12:
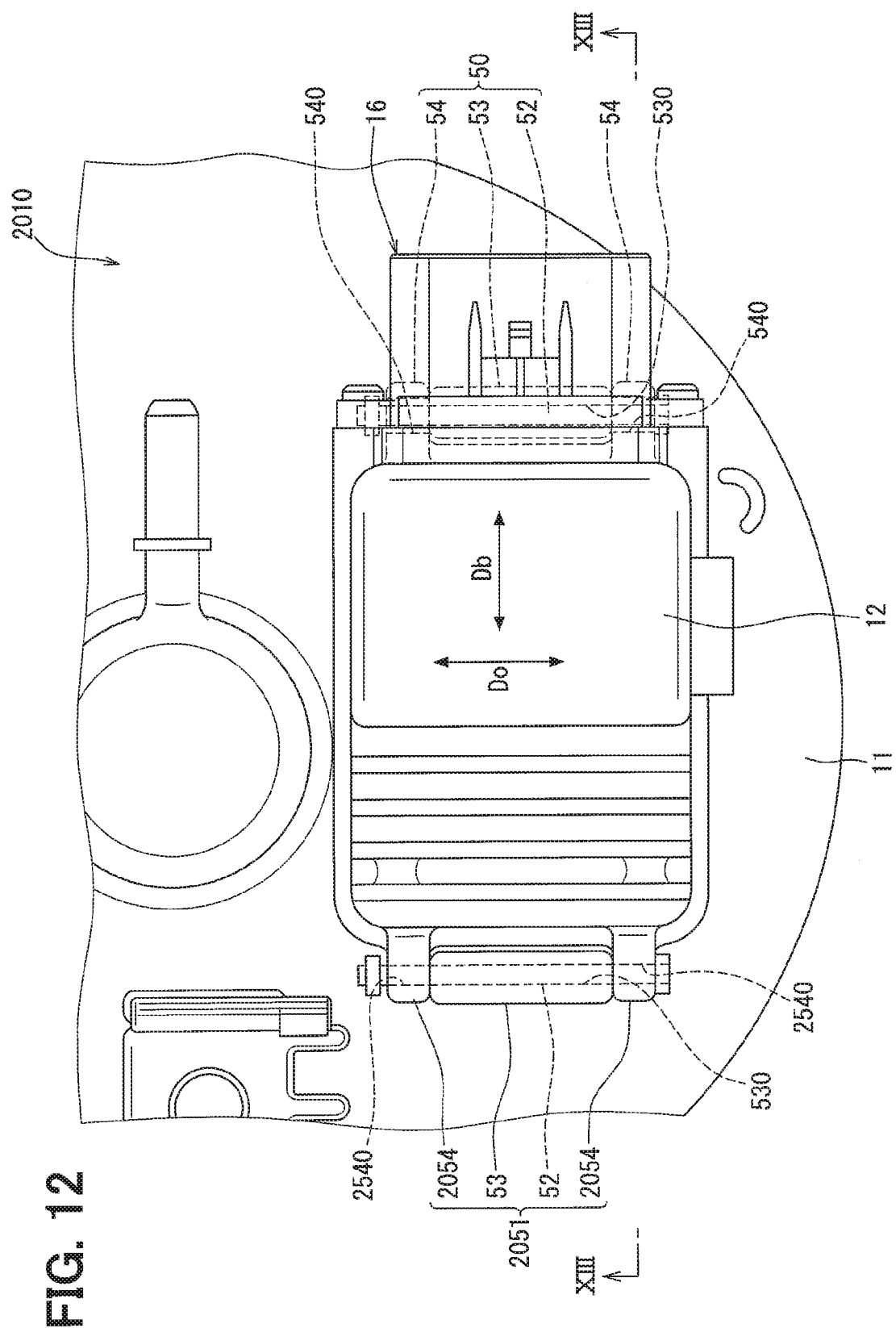
FIG. 12 is a top view illustrating a tank lid unit of a fuel supply device according to a second embodiment, which corresponds to FIG. 7.
Figure 13:
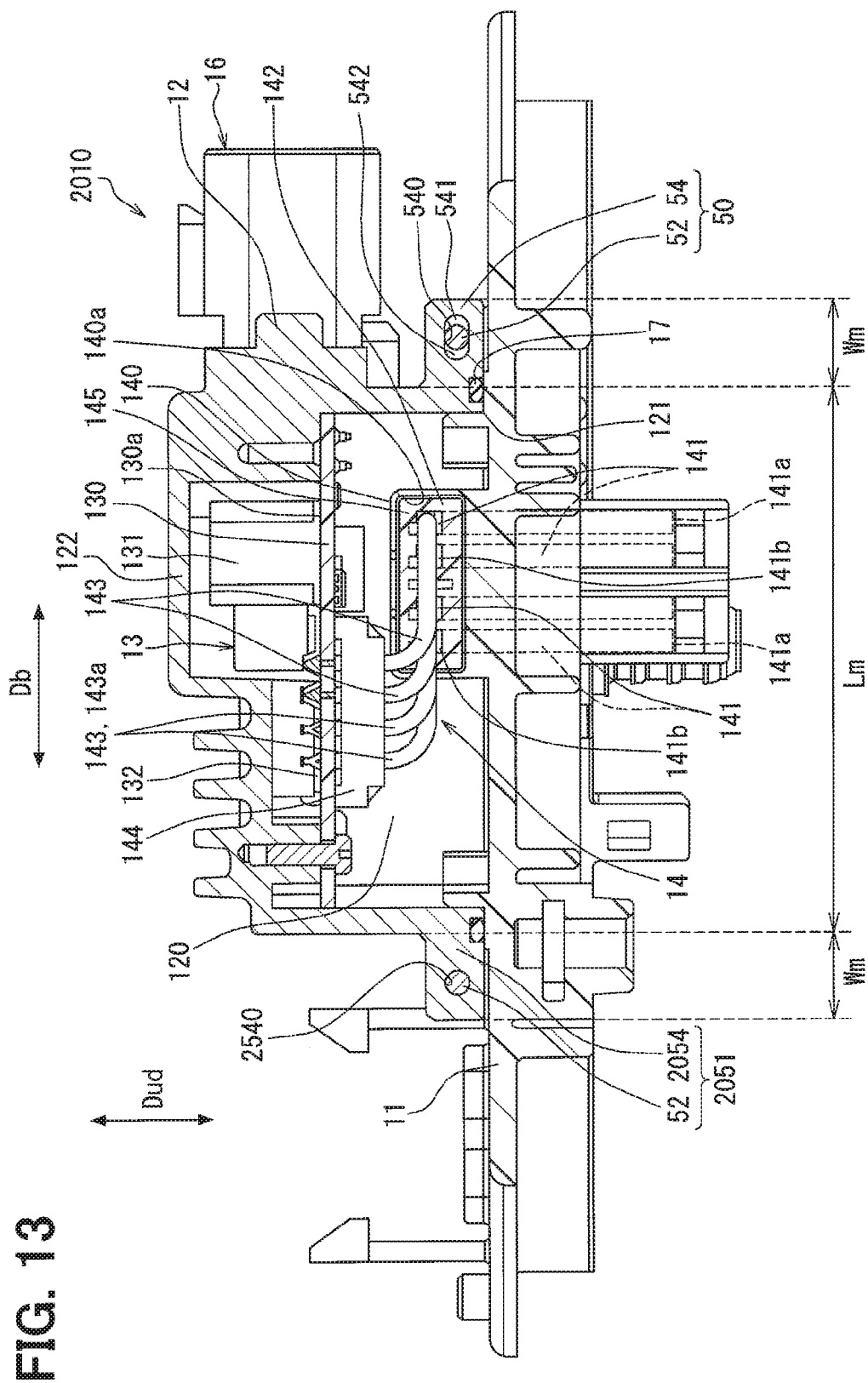
FIG. 13 is a cross-sectional view taken along a line XIII-XIII in FIG. 12, which corresponds to FIG. 5.

As illustrated in FIGS. 12 and 13, a second embodiment of the present disclosure is a modification of the first embodiment. In a tank lid unit 2010 according to the second embodiment, a metal protrusion 54 of the first embodiment is provided as a first metal protrusion 54 in a first assembling structure 50 while a second metal protrusion 2054 configured different from the first metal protrusion 54 of the first embodiment is provided in a second assembling structure 2051.

More specifically, a fitting hole 2540 penetrates through the second metal protrusions 2054 provided one by one at each of both side portions sandwiching a resin protrusion 53 in an orthogonal direction Do in the second assembling structure 2051 in a cylindrical hole shape extending along the orthogonal direction Do. A metal rod 52 is inserted coaxially through the fitting hole 2540 of each second metal protrusion 2054 along the orthogonal direction Do. In this example, an inner diameter dimension (diameter dimension) of the fitting hole 2540 is set to be substantially the same as or slightly larger than an outer diameter dimension (diameter dimension) of the metal rod 52. By the insertion under the above setting, the metal rod 52 fixedly fitted in the fitting hole 2540 of each metal protrusion 54 is sandwiched by the fitting holes 2540 from both sides in a reference radial direction Db and both sides in a vertical direction Dud. Incidentally, except for the above-described configurations, the configurations of the second assembling structure 2051 and the second metal protrusion 2054 are substantially the same as those of the second assembling structure 51 and the metal protrusions 54 described in the first embodiment. In addition, the configurations of the first assembling structure 50 and the first metal protrusion 54 are substantially the same as those described in the first embodiment.

Figure 14:
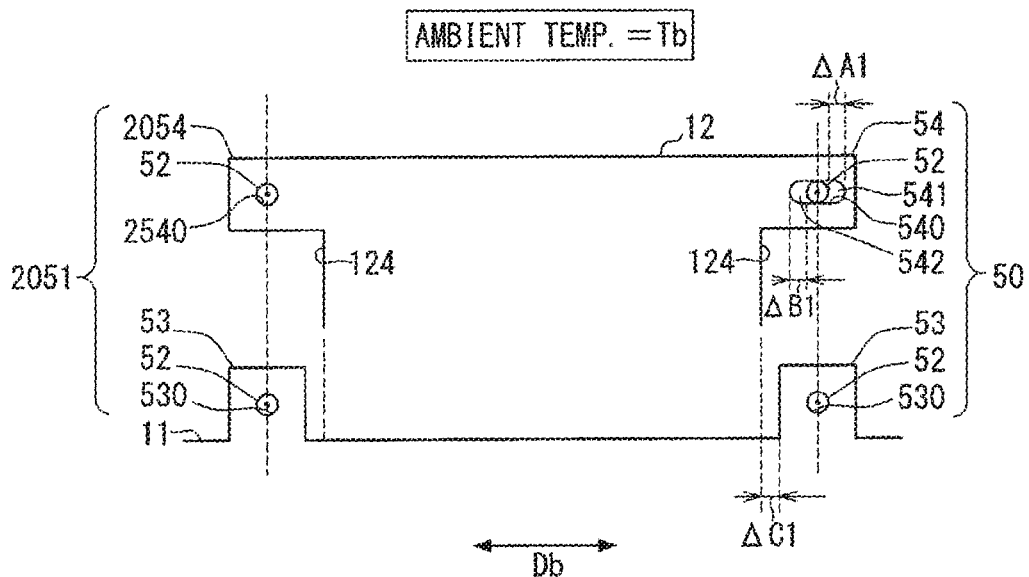
FIG. 14 is a schematic view for illustrating the first assembling structure and the second assembling structure of FIG. 12.

Further, in the first assembling structure 50 of the assembling structures 50 and 2051 described above in which an ambient temperature reaches a reference temperature Tb as illustrated in FIG. 14, a spacing dimension of a gap 541 provided by the metal rod 52 on a side opposite to a metal housing 12 in each of holes 530 and 540 is defined as ΔA1. Further, in the first assembling structure 50 in which the ambient temperature has reached the reference temperature Tb, a spacing dimension of a gap 542 provided by the metal rod 52 in each of the holes 530 and 540 on the metal housing 12 side is represented by ΔB1. Further, in each of the assembling structures 50 and 2051 in which the ambient temperature has reached the reference temperature Tb, spacing dimensions from the resin protrusion 53 to a side portion 124 of the metal housing 12 are defined as ΔC1 and ΔC2, respectively.

Figure 15:
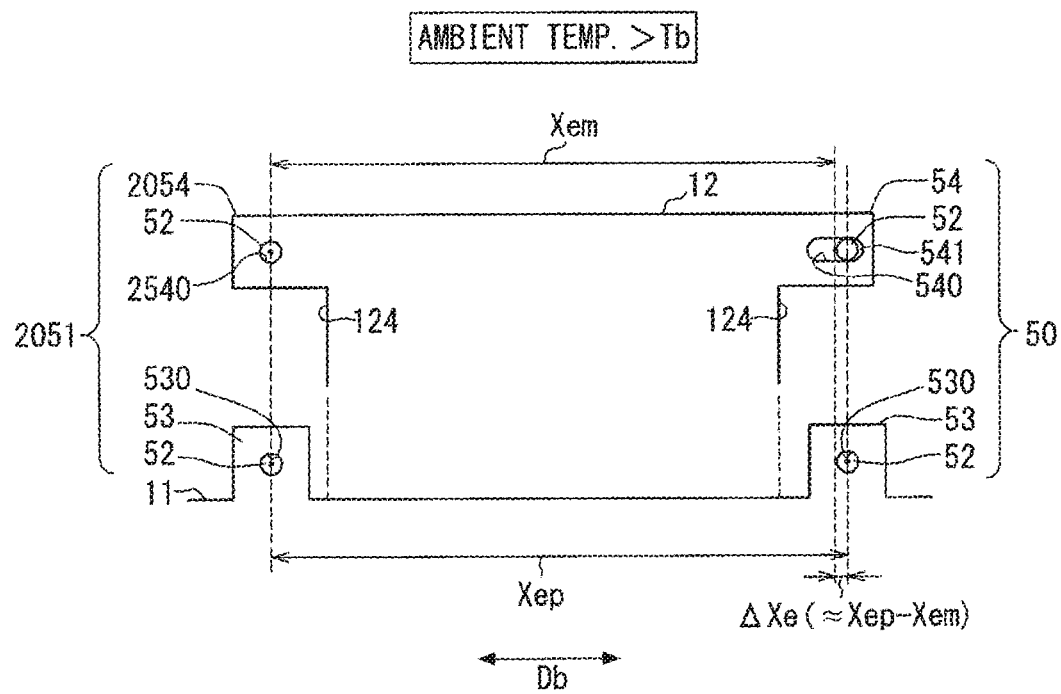
FIG. 15 is a schematic view for illustrating the first assembling structure and the second assembling structure of FIG. 12.

Under such a definition, as illustrated in FIG. 15, when the ambient temperature exceeds the reference temperature Tb, the resin lid main body 11 thermally expands more than the metal housing 12. As a result, a center-to-center distance Xep between the respective holes 530 in each of the assembling structures 50 and 2051 is set to be larger than a center-to-center distance Xem between the respective holes 540 and 2540 of the metal protrusions 54 and 2054 that sandwich the metal housing 12 in the reference radial direction Db in each of the assembling structures 50 and 2051. In this example, a difference (=Xep−Xem) between the center-to-center distances Xep and Xem in the reference radial direction Db can be substantially approximated to a difference in the thermal expansion amount ΔXe between the resin lid main body 11 and the metal housing 12 because of the reasons conforming to the first embodiment.

Therefore, in the first assembling structure 50 according to the second embodiment, as illustrated in FIG. 14, the spacing dimension ΔA1 of the gap 541 provided by the metal rod 52 on the side opposite to the metal housing 12 is set to be larger than a maximum predicted value of a difference in the thermal expansion amount ΔXe when the ambient temperature exceeds the reference temperature Tb. In this example, the maximum predicted value of the difference in the thermal expansion amount ΔXe is set in the same manner as that in the first embodiment.

Figure 16:
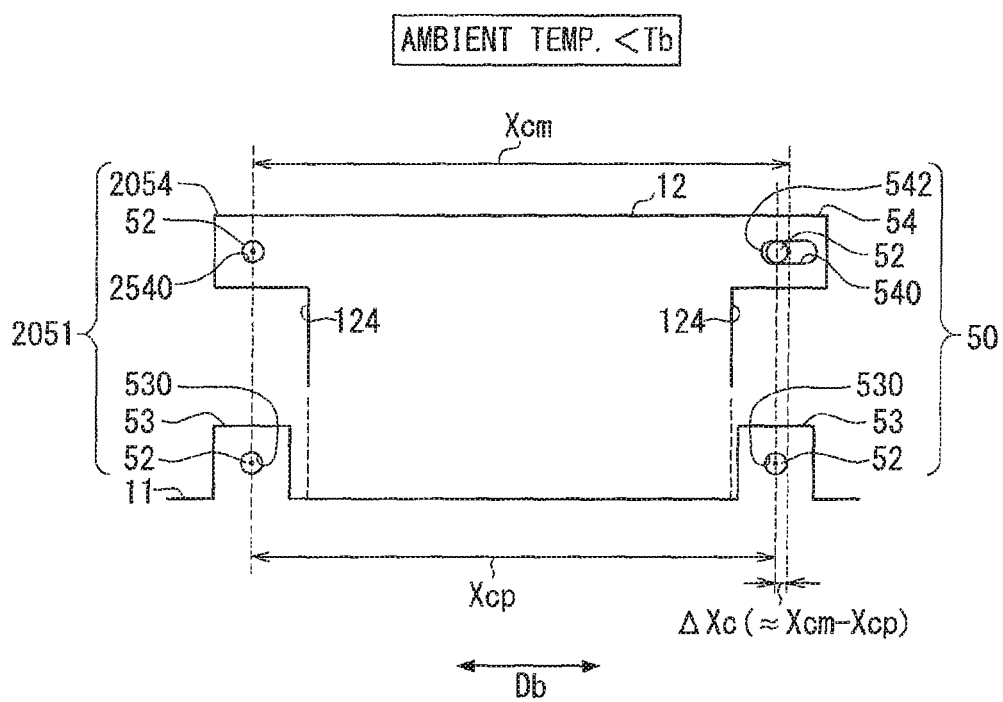
FIG. 16 is a schematic view for illustrating the first assembling structure and the second assembling structure of FIG. 12.

On the other hand, as illustrated in FIG. 16, when the ambient temperature falls below the reference temperature Tb, the resin lid main body 11 thermally expands more than the metal housing 12. As a result, a center-to-center distance Xcp between the respective holes 530 in each of the assembling structures 50 and 2051 is set to be smaller than a center-to-center distance Xcm between the respective holes 540 and 2540 of the metal protrusions 54 and 2054 that sandwich the metal housing 12 in the reference radial direction Db in each of the assembling structures 50 and 2051. In this example, a difference (=Xcm−Xcp) between the center-to-center distances Xcp and Xcm in the reference radial direction Db can be substantially approximated to a difference in the thermal shrinkage amount ΔXc between the resin lid main body 11 and the metal housing 12 because of the reasons conforming to the first embodiment.

Therefore, in the first assembling structure 50 according to the second embodiment, as illustrated in FIG. 14, the spacing dimension ΔB1 of the gap 542 provided by the metal rod 52 on the metal housing 12 side is set to be larger than a maximum predicted value of a difference in the thermal shrinkage amount ΔXc when the ambient temperature falls below the reference temperature Tb. At the same time, in the first assembling structure 50 according to the second embodiment, as illustrated in FIG. 14, a spacing dimension ΔC1 between the resin protrusion 53 and the side portion 124 of the metal housing 12 is set to be larger than the maximum predicted value of the difference in the thermal shrinkage amount ΔXc when the ambient temperature falls below the reference temperature Tb. In this example, the maximum predicted value of the difference in the thermal shrinkage amount ΔXc is set in the same manner as that in the first embodiment.

(Operational Effects)

The operational effects of the second embodiment described above will be described below.

According to the second embodiment, in the assembling structures 50 and 2051 on both sides of the metal housing 12 in the reference radial direction Db of the resin lid main body 11, the resin protrusion 53 integral with the resin lid main body 11 and the metal protrusion 54 integral with the metal housing 12 are protruded upward and laterally along the reference radial direction Db, respectively. In the second assembling structure 2051 of those assembling structures 50 and 2051, the metal rod 52 is inserted through and fixedly fitted to the resin protrusion 53 and the second metal protrusion 2054. On the other hand, in the first assembling structure 50, the metal rod 52 that is inserted through and fixedly fitted to the resin protrusion 53 is also inserted through the first metal protrusion 54. As a result, the gaps 541 and 542 are provided in the reference radial direction Db between the metal rod 52 and the first metal protrusion 54.

For that reason, when the resin lid main body 11 and the metal housing 12 are thermally expanded or thermally shrunk, the positional deviation between the resin protrusion 53 and the second metal protrusion 2054 which are fixedly fitted to the metal rod 52 is restricted in the second assembling structure 2051. On the other hand, in the first assembling structure 50, when the resin lid main body 11 and the metal housing 12 are thermally expanded or thermally shrunk, the positional deviation between the resin protrusion 53 and the first metal protrusion 54 is enabled according to the gaps 541 and 542. Further, in each of the assembling structures 50 and 2051, when the metal rod 52 inserted through and fixedly fitted to the resin protrusion 53 is also inserted through the metal protrusion 54 or 2054, to thereby separate the resin protrusion 53 from the metal housing 12. For that reason, when the resin lid main body 11 and the metal housing 12 thermally shrink, the positional deviation between the metal housing 12 and the resin protrusion 53 in each of the assembling structures 50 and 2051 is enabled according to the separation.

Therefore, the spacing dimensions $\Delta A1$ of the gap 541 provided by the metal rod 52 on the side opposite to the metal housing 12 in the first assembling structure 50 is set to be larger than the difference in the thermal expansion amount $\Delta Xe$ between the resin lid main body 11 and the metal housing 12 in the reference radial direction Db when the ambient temperature exceeds the reference temperature Tb. As a result, in the first assembling structure 50, even if the ambient temperature increases and exceeds the reference temperature Tb, the positional deviation of the resin protrusion 53 from the first metal protrusion 54 together with the metal rod 52 to the side opposite to the metal housing 12 is acceptable in the reference radial direction Db due to the gap 541 of the spacing dimension $\Delta A1$ larger than the difference in the thermal expansion amount $\Delta Xe$. Therefore, when the ambient temperature exceeds the reference temperature Tb, the damage of a portion of the resin lid main body 11 to which the metal housing 12 is assembled can be reduced.

In addition, the spacing dimensions $\Delta B1$ of the gap 542 provided by the metal rod 52 on the side toward the metal housing 12 in the first assembling structure 50 is set to be larger than the difference in the thermal shrinkage amount $\Delta Xc$ between the resin lid main body 11 and the metal housing 12 in the reference radial direction Db when the ambient temperature falls below the reference temperature Tb. At the same time, the spacing dimension $\Delta C1$ between the resin protrusion 53 and the metal housing 12 in the first assembling structure 50 is also set to be larger than the difference in the thermal shrinkage amount $\Delta Xc$ when the ambient temperature falls below the reference temperature Tb. With the above setting, in the first assembling structure 50, even if the ambient temperature decreases and falls below the reference temperature Tb, the positional deviation of the resin protrusion 53 from the first metal protrusion 54 together with the metal rod 52 to the metal housing 12 side is acceptable in the reference radial direction Db due to the gap 542 of the spacing dimension $\Delta B1$ larger than the difference in the thermal shrinkage amount $\Delta Xc$. At the same time, in each of the assembling structures 50 and 2051, even if the ambient temperature decreases and falls below the reference temperature Tb, the positional deviation of the resin protrusion 53 together with the metal rod 52 to the metal housing 12 side is acceptable in the reference radial direction Db due to the separation of the dimension $\Delta C1$ larger than the difference in the thermal shrinkage amount $\Delta Xc$. As a result, even when the ambient temperature falls below the reference temperature Tb, the damage of a portion of the resin lid main body 11 to which the metal housing 12 is assembled can be reduced.

As described above, according to the second embodiment, the dimension setting is applied to the tank lid unit 2010 as described above. As a result, the positional deviation of the resin protrusion 53 from the metal protrusions 54, 2054 and the metal housing 12 is permissible in the reference radial direction Db, and the effect of reducing the damage can be exerted.

Furthermore, similarly, in the second embodiment, the buffer member 17 that absorbs the shock between the resin lid main body 11 and the metal housing 12 above the resin lid main body 11 is made of an elastic material so as to generate an elastic restoring force for pressing the metal housing 12 upward. Therefore, in each of the first assembling structure 50, the elongated hole 540 in which a longitudinal direction of the first metal protrusion 54 is along the reference radial direction Db is adopted. As in the first embodiment, the elongated hole 540 provides the gaps 541 and 542 in the reference radial direction Db by insertion of the metal rod 52 into the elongated hole 540, and the metal rod 52 is sandwiched from both sides of the metal rod 52 in the vertical direction Dud. Therefore, even in a state where the first metal protrusion 54 is pressed upward by the elastic restoring force received from the buffer member 17, the positional deviation of the metal rod 52 and the resin protrusion 53 from the first metal protrusion 54 restricted in the reference radial direction Db, thereby being capable of enhancing the effect of reducing the damage.

Furthermore, according to the second embodiment, on the opposite side of the metal housing 12 in the radial direction Db with respect to an external connector 160 fitted into the metal housing 12 along the reference radial direction Db, the metal rod 52 in the second assembling structure 2051 is fixedly fitted to the metal protrusion 2054. As a result, at the time of manufacturing the tank lid unit 2010, even if the external connector 160 is fitted into the metal housing 12 integrated with the second metal protrusion 2054 along the reference radial direction Db, the positional deviation between the second metal protrusion 2054 and the resin protrusion 53 can be regulated. Therefore, with the implementation of the above manufacturing method at the reference temperature Tb, since the desired spacing dimensions $\Delta A1$ and $\Delta B1$ can be given to the gaps 541 and 542, respectively, between the first metal protrusion 54 integrated with the metal housing 12 and the metal rod 52, the effect of reducing the damage can be ensured.

Third Embodiment

Figure 17:
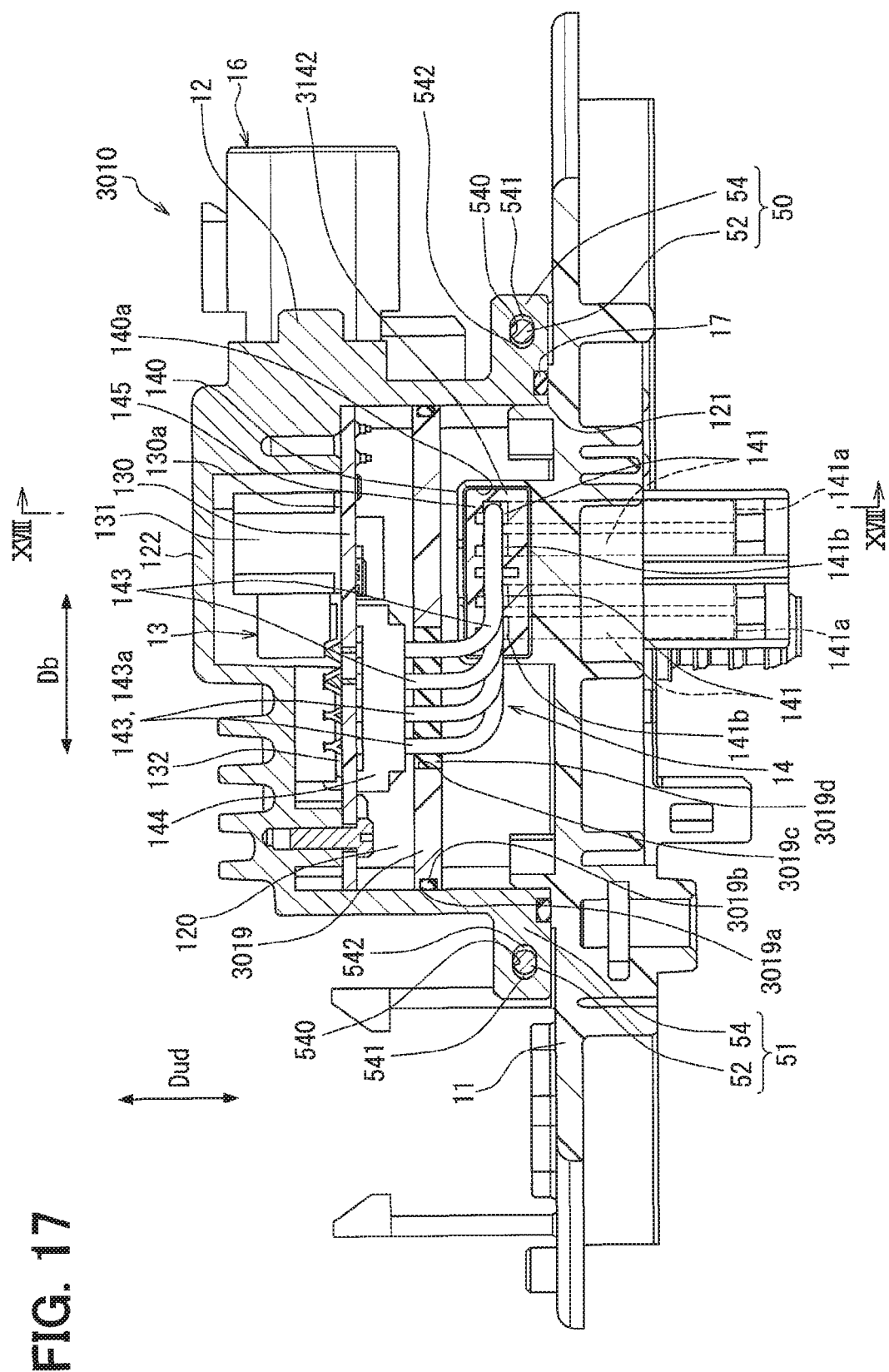
FIG. 17 is a vertically cross-sectional view illustrating a tank lid unit of a fuel supply device according to a third embodiment, which corresponds to FIG. 5.
Figure 18:
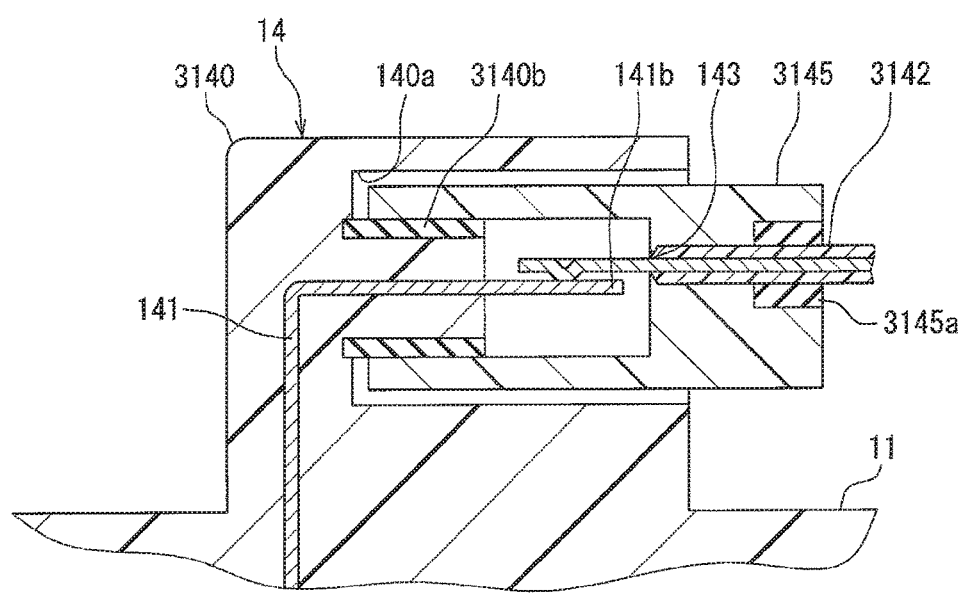
FIG. 18 is a cross-sectional view taken along a line XVIII-XVIII in FIG. 17.

As illustrated in FIGS. 17 and 18, a third embodiment of the present disclosure is a modification of the first embodiment. As illustrated in FIG. 17, a tank lid unit 3010 according to the third embodiment includes a partitioning member 3019 that partitions an accommodation space 120 in a metal housing 12 between a circuit board 130 and a resin connector 140.

More specifically, the partitioning member 3019 is made of a resin material such as polyphenylene sulfide resin (PPS) and shaped in a rectangular plate-like shape. The partitioning member 3019 is disposed below the circuit board 130 and above the resin connector 140. An outer peripheral edge portion 3019a of the partitioning member 3019 is held by a side portion 124 of the metal housing 12. As the above holding portion, a space between the partitioning member 3019 and the side portion 124 is sealed with a sealing member 3019b attached to an entire circumference of the outer peripheral edge portion 3019a. In this example, the sealing member 3019b is made of an elastic material such as fluororubber and formed in a rectangular annular shape.

A through hole 3019c is provided in the partitioning member 3019 so that each of flexible lead wires 143 of a flexible cable 3142 penetrates between both end portions 143a and 143b. As such a penetrating portion, a space between the partitioning member 3019 and the flexible cable 3142 is sealed with a sealing member 3019d fitted around an entire circumference of the through hole 3019c and into which all of the flexible lead wires 143 are press-fitted. In this example, the sealing member 3019d is made of an elastic material such as fluororubber.

As illustrated in FIG. 18, in the flexible cable 3142 of the third embodiment, an embedded portion of each flexible lead wire 143 in a second common connector 3145 is sealed with a sealing member 3145a. At the same time, in a resin connector 3140 of the third embodiment, an insertion position of the second common connector 3145 in a lateral hole 140a is sealed over an entire circumference with a sealing member 3140b. In this example, the sealing members 3145a and 3140b are made of an elastic material such as fluororubber. Except for the configurations described above, the configurations of the flexible cable 3142 and the resin connector 3140 are substantially the same as those of the flexible cable 142 and the resin connector 140 described in the first embodiment.

(Operational Effects)

The advantageous effects of the third embodiment described above will be described below.

According to the third embodiment, in the partitioning member 3019 that partitions the metal housing 12 between the circuit board 130 and the resin connector 3140, both of the penetrating portion through which the flexible cable 3142 penetrates and the holding portion that is held by the metal housing 12 are sealed. According to the partition and sealing described above, even if the leaked electrolytic solution from a electrolytic capacitor 131 goes downward of the circuit board 130, the leaked electrolytic solution can be prevented from reaching the resin connector 3140 and further the resin lid main body 11. Therefore, the effect of reducing the situation in which the resin lid main body 11 melts owing to the arrival of the leaked electrolytic solution and causes fuel vapor leakage can be enhanced.

Furthermore, in the metal housing 12 according to the third embodiment, in addition to the above-described penetrating portion and the holding portion of the partitioning member 3019, the above-described embedded portion of the flexible cable 3142 and the above-described insertion portion of the resin connector 3140 are sealed. According to the sealing described above, a drive circuit 13 and each metal terminal 141 can be protected against liquid such as moisture outside of the metal housing 12, even if the buffer member 17 is not provided with the sealing function. Incidentally, as the operational effects other than those described above, the operational effects similar to those of the first embodiment can be exerted.

Other Embodiments

Hereinbefore, multiple embodiments of the present disclosure are described. However, the present disclosure is not interpreted to be limited to the embodiments, and various embodiments and combinations thereof may be applied within a scope which does not depart from the gist of the present disclosure.

More specifically, as a first modification of the first to third embodiments, the buffer member 17 may not be provided. In a second modification relating to the first to third embodiments, in each of the first assembling structure 50 and the second assembling structures 51, 2051, the thermal expansion coefficient of the metal material forming the metal rod 52 may be substantially equal to or larger than the thermal expansion coefficient of the metal material forming the metal protrusions 54 and 2054 formed integrally with the metal housing 12.

In a third modification related to the first to third embodiments, an orthogonal direction Do is set to a new reference radial direction Db, and the first assembly structure 50 and the second assembling structure 51, 2051 may be added to both sides sandwiching the metal housing 12 in the orthogonal direction Do. Further, in a fourth modification related to the first to third embodiments, the resin protrusion 53 in the first assembling structure 50 may be provided in two or more places. Furthermore, as a fifth modification of the first to third embodiments, the metal protrusion 54 in the second assembling structures 51 and 2051 may be provided at one or more than three places.

In a sixth modification of the first to third embodiments, the metal terminal 141 may be electrically connected directly to the drive circuit 13 without providing the flexible cables 142, 3142 and the resin connectors 140, 3140. Further, in a seventh modification related to the first to third embodiments, the electrolytic capacitor 131 may be mounted on a lower surface of the circuit board 130. Furthermore, in a eighth modification related to the first to third embodiments, the resin connectors 140 and 3140 are opened upward and the second end portions 143b of the flexible cables 142 and 3142 may be inserted into an inner peripheral side of the resin connectors 140 and 3140 from above.

In a ninth modification of the second embodiment, the partitioning configuration and the sealing configuration of the third embodiment may be applied. Further, in a tenth modification of the third embodiment, at least one of the sealing members 3019b, 3019d, 3145a, and 3140b may not be provided as long as the buffer member 17 has a sealing function.

The invention claimed is:

1. A tank lid unit that is installed at a through hole of a fuel tank and houses a drive circuit for driving a fuel pump in the fuel tank, comprising:
   a resin lid main body that is made of a resin material and closes the through hole;
   a metal housing that is made of a metal material and internally houses the drive circuit; and
   a first assembling structure and a second assembling structure which are disposed on both sides of the metal housing in a reference radial direction of the resin lid main body, and which assemble the metal housing above the resin lid main body, wherein
   each of the first assembling structure and the second assembling structure includes:
     a metal rod that is made of a metal material;
     a resin protrusion that is formed integrally with the resin lid main body and protrudes upward from the resin lid main body at a place spaced away from the metal housing laterally along the reference radial direction, the resin protrusion being fixedly fitted to the metal rod due to the metal rod being inserted through the resin protrusion; and
     a metal protrusion that is formed integrally with the metal housing and protrudes from the metal housing laterally along the reference radial direction, the metal protrusion providing a gap in the reference radial direction between the metal protrusion and the metal rod due to the metal rod being inserted through the metal protrusion,
   a total dimension of a spacing dimension of the gap provided by the metal rod on a side opposite to the metal housing in the first assembling structure and a spacing dimension of the gap provided by the metal rod on a side opposite to the metal housing in the second assembling structure is set to be larger than a difference in a thermal expansion amount between the resin lid main body and the metal housing in the reference radial direction when a temperature exceeds a reference temperature, a total dimension of a spacing dimension of the gap provided by the metal rod on a side toward the metal housing in the first assembling structure and a spacing dimension of the gap provided by the metal rod on a side toward the metal housing in the second assembling structure is set to be larger than a difference in a thermal shrinkage amount between the resin lid main body and the metal housing in the reference radial direction when the temperature falls below the reference temperature, and a total dimension of a spacing dimension between the resin protrusion and the metal housing in the first assembling structure and a spacing dimension between the resin protrusion and the metal housing in the second assembling structure is set to be larger than the difference in the thermal shrinkage amount.

2. The tank lid unit according to claim 1, further comprising:
a buffer member that is made of an elastic material and absorbs a shock between the resin lid main body and the metal housing, wherein
the metal protrusion in each of the first assembling structure and the second assembling structure includes an elongated hole whose longitudinal direction extends along the reference radial direction, the elongated hole holding the metal rod from both sides of the metal rod in a vertical direction with the gap provided in the reference radial direction due to the metal rod being inserted through the elongated hole.

3. The tank lid unit according to claim 1, wherein in each of the first assembling structure and the second assembling structure, a thermal expansion coefficient of the metal material forming the metal rod is set to be smaller than a thermal expansion coefficient of the metal material forming the metal protrusion integrally with the metal housing.

4. The tank lid unit according to claim 1, wherein
in each of the first assembling structure and the second assembling structure, a projection dimension of the resin protrusion from the resin lid main body in a vertical direction is set to be smaller than an outer diameter dimension of the resin lid main body in the reference radial direction.

5. The tank lid unit according to claim 1, further comprising:
a flexible cable that has flexibility, is disposed in a relaxed state in the metal housing, and has a first end portion electrically connected to the drive circuit;
a resin connector that is integrally formed with the resin lid main body, a second end portion of the flexible cable being installed to the resin connector within the metal housing; and
a metal terminal that is embedded in the resin connector, the metal terminal electrically connecting the second end portion to the fuel pump.

6. The tank lid unit according to claim 5, wherein
the drive circuit includes an electrolytic capacitor of an electrolytic solution type mounted on an upper surface of a circuit board, and
the resin connector includes a lateral hole opened laterally in the metal housing below the circuit board, the lateral hole being provided above the resin lid main body and the second end portion being inserted into the lateral hole from a side.

7. The tank lid unit according to claim 6, further comprising:
a partitioning member that partitions the metal housing between the circuit board and the resin connector, wherein the partitioning member includes a penetration portion through which the flexible cable penetrates and a holding portion that is held by the metal housing which are sealed.

8. A fuel supply device comprising:
a fuel pump that supplies a fuel from an inside of a fuel tank to an outside of the fuel tank; and
the tank lid unit according to claim 1.

9. A tank lid unit that is installed at a through hole of a fuel tank and houses a drive circuit for driving a fuel pump in the fuel tank, comprising:
a resin lid main body that is made of a resin material and closes the through hole;
a metal housing that is made of a metal material and internally houses the drive circuit; and
a first assembling structure and a second assembling structure which are disposed on both sides of the metal housing in a reference radial direction of the resin lid main body, and which assemble the metal housing above the resin lid main body, wherein
each of the first assembling structure and the second assembling structure includes:
a metal rod that is made of a metal material;
a resin protrusion that is formed integrally with the resin lid main body and protrudes upward from the resin lid main body at a place spaced away from the metal housing laterally along the reference radial direction, the resin protrusion being fixedly fitted to the metal rod due to the metal rod being inserted through the resin protrusion; and
a metal protrusion that is formed integrally with the metal housing and protrudes from the metal housing laterally along the reference radial direction, the metal rod being inserted through the metal protrusion,
a first metal protrusion that serves as the metal protrusion of the first assembling structure provides a gap between the first metal protrusion and the inserted metal rod in the reference radial direction,
a second metal protrusion that serves as the metal protrusion of the second assembling structure is fixedly fitted to the inserted metal rod,
a spacing dimension of the gap provided by the metal rod on a side opposite to the metal housing in the first assembling structure is set to be larger than a difference in a thermal expansion amount between the resin lid main body and the metal housing in the reference radial direction when a temperature exceeds a reference temperature, and
a spacing dimension of the gap provided by the metal rod on a side toward the metal housing in the first assembling structure and a spacing dimension between the resin protrusion and the metal housing in the first assembling structure are set to be larger than a difference in a thermal shrinkage amount between the resin lid main body and the metal housing in the reference radial direction when the temperature falls below the reference temperature.

10. The tank lid unit according to claim 9, further comprising:

a buffer member that is made of an elastic material and absorbs a shock between the resin lid main body and the metal housing, wherein the first metal protrusion of the first assembling structure includes an elongated hole whose longitudinal direction extends along the reference radial direction, the elongated hole holding the metal rod from both sides of the metal rod in a vertical direction with the gap provided in the reference radial direction due to the metal rod being inserted through the elongated hole.

* * * * *